United States Patent
Palaios et al.

(10) Patent No.: US 12,520,180 B2
(45) Date of Patent: Jan. 6, 2026

(54) CONTROLLING TRANSMISSION ON A RESOURCE SUBJECT TO A LISTEN-BEFORE-TALK PROCEDURE

(71) Applicant: Telefonaktiebolaget LM Ericsson (publ), Stockholm (SE)

(72) Inventors: Alexandros Palaios, Herzogenrath (DE); Torsten Dudda, Wassenberg (DE); Junaid Ansari, Aachen (DE); Philipp Geuer, Frechen (DE); Dhruvin Patel, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 324 days.

(21) Appl. No.: 18/548,947

(22) PCT Filed: Mar. 9, 2021

(86) PCT No.: PCT/EP2021/055837
§ 371 (c)(1),
(2) Date: Sep. 5, 2023

(87) PCT Pub. No.: WO2022/188949
PCT Pub. Date: Sep. 15, 2022

(65) Prior Publication Data
US 2024/0155390 A1     May 9, 2024

(51) Int. Cl.
*H04W 24/08*     (2009.01)
*H04W 24/02*     (2009.01)
*H04W 74/0808*     (2024.01)

(52) U.S. Cl.
CPC .......... *H04W 24/08* (2013.01); *H04W 24/02* (2013.01); *H04W 74/0808* (2013.01)

(58) Field of Classification Search
None
See application file for complete search history.

(56) References Cited

U.S. PATENT DOCUMENTS

| 2010/0069013 A1 | 3/2010 | Chaudhri et al. |
| 2020/0351940 A1* | 11/2020 | Deogun ............ H04W 74/0808 |
| 2022/0070698 A1* | 3/2022 | Jiang .................... H04B 17/382 |

FOREIGN PATENT DOCUMENTS

| WO | WO-2018202658 A1 * | 11/2018 | ............. H04B 1/713 |
| WO | 2021197596 A1 | 10/2021 | |

OTHER PUBLICATIONS

"ETSI EN 300 328 V2.2.1", Wideband transmission systems; Data transmission equipment operating in the 2,4 GHZ band; Harmonised Standard for access to radio spectrum, Apr. 2019, 1-101.

(Continued)

*Primary Examiner* — Faruk Hamza
*Assistant Examiner* — Cassandra L Decker
(74) *Attorney, Agent, or Firm* — Murphy, Bilak & Homiller, PLLC

(57) ABSTRACT

Wireless communication equipment (18) is configured for use in a wireless communication network (10). As listen-before-talk, LBT, attempts occur over time on a transmission resource (16-1 . . . 16-N), the wireless communication equipment (18) makes updates to a performance rating (22-1 . . . 22-N) for the transmission resource (16-1 . . . 16-N) to reflect an observed likelihood of LBT attempt success or failure on the transmission resource (16-1 . . . 16-N). Responsive to a failed LBT attempt on the transmission resource (16-1 . . . 16-N) occurring unexpectedly according to the performance rating (22-1 . . . 22-N), the wireless communication equipment (18) applies a bias (26-*n*) to the performance rating (22-1 . . . 22-N) to reflect a greater likelihood of LBT attempt failure, or a smaller likelihood of LBT attempt success, than actually observed on the transmission resource (16-1 . . . 16-N), and relaxes the applied bias (26-*n*) over time. The wireless communication equipment (18) controls transmission on the transmission (Continued)

resource (16-1 . . . 16-N) based on this performance rating (22-1 . . . 22-N) for the transmission resource (16-1 . . . 16-N).

20 Claims, 17 Drawing Sheets

(56) References Cited

OTHER PUBLICATIONS

Unknown, Author, "Revised WID on NR-based Access to Unlicensed Spectrum", 3GPP TSG RAN Meeting #83; RP-190706; Shenzhen, China, Mar. 18-21, 2019, 1-8.

* cited by examiner

CONTROLLING TRANSMISSION ON A RESOURCE SUBJECT TO A LISTEN-BEFORE-TALK PROCEDURE

TECHNICAL FIELD

The present application relates generally to controlling transmission on a resource, and relates more particularly to controlling transmission on a resource that is subject to a listen-before-talk procedure.

BACKGROUND

Licensed frequency spectrum is typically licensed to a single wireless communication network operator so that only that operator has authority to use the spectrum. By giving the licensed operator exclusive control over use of the spectrum, the operator's network can prevent interference between served wireless devices by controlling which wireless devices use the licensed frequency spectrum at any given time. A wireless device that receives a scheduling grant from the network can therefore be sure that its use of the spectrum will not interfere with use of the spectrum by another wireless device.

Unlicensed or shared frequency spectrum differs from licensed frequency spectrum in that no single operator has been granted authority to use the spectrum exclusively. Unlike in licensed frequency spectrum, then, no single wireless communication network has complete control over which wireless devices use the spectrum at any given time. Accordingly, before the spectrum can be used for a transmission, a listen-before-talk (LBT) procedure must be performed in order to check whether or not the spectrum is clear of competing transmissions. If the spectrum is not clear, the transmission must be postponed. The LBT procedure thereby enables shared use of the spectrum, at the expense of added latency.

Although unlicensed or shared frequency spectrum typically cannot match the qualities of licensed frequency spectrum, using unlicensed or shared frequency spectrum may provide significant value to network operators and users. For example, using unlicensed or shared frequency spectrum as a complement to licensed frequency spectrum may help a network operator to more effectively use the available spectrum and increase system capacity.

In these and other scenarios, a network may still retain some level of control over use of the unlicensed or shared frequency spectrum by the wireless devices served by the network. The network may for example require that a transmission resource in the spectrum be used for a transmission in the network only if both (i) the network has granted the resource for that transmission; and (ii) the spectrum has been cleared by an LBT procedure. In this way, the network can control and improve contention among the wireless devices that the network serves, while the LBT procedure moderates contention with any wireless devices not served by the network. Nonetheless, the contentious nature of the unlicensed or shared frequency spectrum, coupled with additional latency from the LBT procedure, makes it challenging to exploit unlicensed or shared frequency spectrum for providing services subject to strict quality of service requirements. For example, a need still exists for how a network can control use of unlicensed or shared frequency spectrum for providing services such as Ultra-Reliable Low-Latency Communications (URLLC) which have strict requirements on transmission reliability and latency, e.g., 99.9999% reliability within 1 ms one-way latency.

SUMMARY

Some embodiments herein maintain a performance rating for a transmission resource, such as an unlicensed frequency carrier, and control transmission on the transmission resource based on the performance rating. Some embodiments in this regard negatively bias the performance rating responsive to an unexpected failure of a listen-before-talk (LBT) attempt on the resource, but notably relax the bias over time. For example, in some embodiments, the bias is applied and relaxed over time such that the bias effectively tracks the time-varying impact that stochastic noise has on the transmission resource's expected performance, e.g., the bias exponentially decays over time. These and other embodiments attribute some LBT attempt failures to an underlying stochastic noise source, and protect the transmission resource's performance rating from being penalized too heavily and/or for too long in this case. By accounting for the time-varying impact of the stochastic noise source, the performance metric in these and other embodiments more accurately reflects the performance actually attainable on the transmission resource. Controlling transmission on the transmission resource using such a performance metric may thereby improve the achievable performance, e.g., for providing services such as URLLC that require high reliability and/or low latency.

More particularly, embodiments herein include a method performed by wireless communication equipment configured for use in a wireless communication network. The method comprises as listen-before-talk, LBT, attempts occur over time on a transmission resource, making updates to a performance rating for the transmission resource to reflect an observed likelihood of LBT attempt success or failure on the transmission resource. The method also comprises, responsive to a failed LBT attempt on the transmission resource occurring unexpectedly according to the performance rating, applying a bias to the performance rating to reflect a greater likelihood of LBT attempt failure, or a smaller likelihood of LBT attempt success, than actually observed on the transmission resource, and relaxing the applied bias over time. The method also comprises controlling transmission on the transmission resource based on the performance rating for the transmission resource.

In some embodiments, a magnitude of the bias initially applied to the performance rating, before the applied bias is relaxed over time, is equal to a difference between an observed likelihood of LBT attempt success as of occurrence of the failed LBT attempt and an observed likelihood of LBT attempt failure as of occurrence of the failed LBT attempt.

In some embodiments, relaxing the applied bias over time comprises reducing a magnitude of the applied bias at a rate proportional to a current magnitude of the applied bias such that a magnitude of the applied bias exponentially decays.

In some embodiments, relaxing the applied bias over time comprises periodically halving the bias to apply to the performance rating.

In some embodiments, applying the bias comprises applying the bias to the performance rating until the next LBT attempt occurs on the transmission resource.

In some embodiments, the transmission resource is an unlicensed frequency carrier.

In some embodiments, the wireless communication equipment is a radio network node. In some embodiments, the transmission resource is an uplink transmission resource and wherein the LBT attempts are uplink LBT attempts made by a wireless device.

In some embodiments, the performance rating is specific to a certain wireless device and is selectively updated based on LBT attempts made on the transmission resource for a transmission to or from the certain wireless device.

In some embodiments, the performance rating is common across multiple wireless devices and is updated based on LBT attempts made on the transmission resource for a transmission to or from any of the multiple wireless devices.

In some embodiments, the method further comprises determining whether a failed LBT attempt on the transmission resource occurs unexpectedly according to the performance rating by comparing the performance rating before the failed LBT attempt with the performance rating after the failed LBT attempt. The method further comprises determining whether a failed LBT attempt on the transmission resource occurs unexpectedly according to the performance rating by determining whether or not the failed LBT attempt on the transmission resource occurs unexpectedly, based on said comparing.

In some embodiments, the method further comprises determining that the failed LBT attempt on the transmission resource occurs unexpectedly if the performance rating before the failed LBT attempt reflects a higher observed likelihood of LBT attempt success on the transmission resource than the performance rating after the failed LBT attempt. Alternatively, the method further comprises determining that the failed LBT attempt on the transmission resource occurs unexpectedly if the performance rating before the failed LBT attempt reflects a lower observed likelihood of LBT attempt failure on the transmission resource than the performance rating after the failed LBT attempt.

In some embodiments, the method further comprises performing said updating, applying, relaxing, and controlling for each of multiple transmission resources, wherein said controlling is performed based on the respective performance ratings for the multiple transmission resources.

In some embodiments, controlling transmission on the transmission resource comprises performing transmission resource selection. Additionally or alternatively, controlling transmission on the transmission resource comprises transmission resource aggregation. Additionally or alternatively, controlling transmission on the transmission resource comprises transmission parameter adaptation.

Other embodiments herein include wireless communication equipment configured for use in a wireless communication network. The wireless communication equipment is configured to as listen-before-talk, LBT, attempts occur over time on a transmission resource, make updates to a performance rating for the transmission resource to reflect an observed likelihood of LBT attempt success or failure on the transmission resource. The wireless communication equipment is also configured to, responsive to a failed LBT attempt on the transmission resource occurring unexpectedly according to the performance rating, apply a bias to the performance rating to reflect a greater likelihood of LBT attempt failure, or a smaller likelihood of LBT attempt success, than actually observed on the transmission resource, and relax the applied bias over time. The wireless communication equipment is also configured to, based on the performance rating for the transmission resource, perform transmission resource scheduling, transmission resource aggregation, and/or transmission parameter adaptation.

In some embodiments, the wireless communication equipment is configured to perform the steps described above tor a wireless communication equipment.

Other embodiments herein include a computer program comprising instructions which, when executed by at least one processor of wireless communication equipment, causes the wireless communication equipment to carry out the steps described above tor a wireless communication equipment.

In some embodiments, a carrier containing the computer program is one of an electronic signal, optical signal, radio signal, or computer readable storage medium.

Other embodiments herein include wireless communication equipment configured for use in a wireless communication network. The wireless communication equipment comprises communication circuitry and processing circuitry. The processing circuitry is configured to, as listen-before-talk, LBT, attempts occur over time on a transmission resource, make updates to a performance rating for the transmission resource to reflect an observed likelihood of LBT attempt success or failure on the transmission resource. The processing circuitry is also configured to, responsive to a failed LBT attempt on the transmission resource occurring unexpectedly according to the performance rating, apply a bias to the performance rating to reflect a greater likelihood of LBT attempt failure, or a smaller likelihood of LBT attempt success, than actually observed on the transmission resource, and relax the applied bias over time. The processing circuitry is also configured to, based on the performance rating for the transmission resource, perform transmission resource scheduling, transmission resource aggregation, and/or transmission parameter adaptation.

In some embodiments, the processing circuitry is configured to perform the steps described above tor a wireless communication equipment.

DETAILED DESCRIPTION

Figure 1:
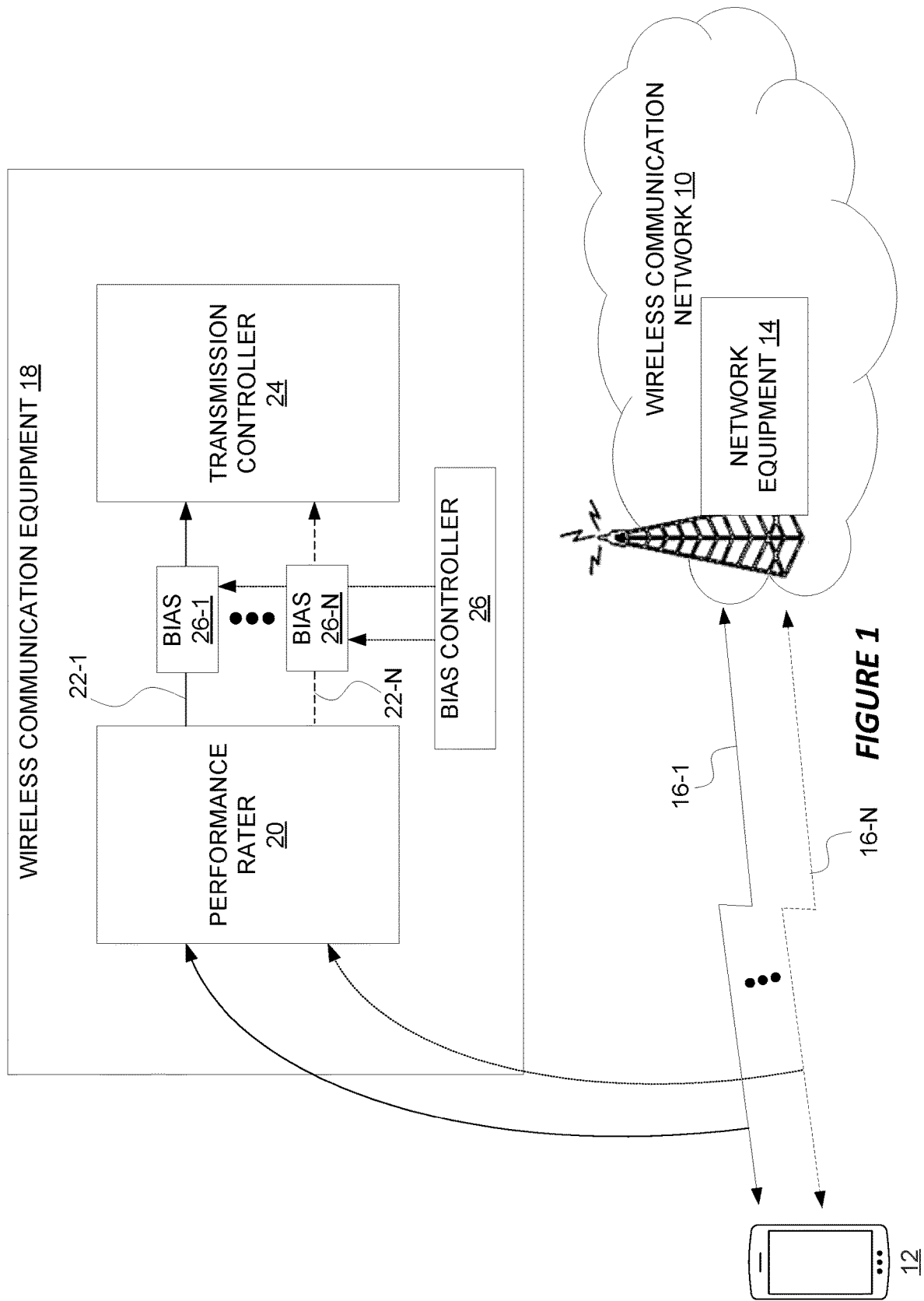
FIG. 1 is a block diagram of wireless communication equipment configured for use with a wireless communication network according to some embodiments.

FIG. 1 shows a wireless communication network 10 according to some embodiments. The wireless communication network 10 provides wireless communication service to one or more wireless devices (e.g., user equipment, UE), one of which is shown as wireless device 12. The wireless communication network 10 in this regard includes network equipment 14 (e.g., in the form of a base station, relay node, or other network node) that controls transmissions to the wireless device(s) in a downlink direction and/or transmissions from the wireless device(s) in an uplink direction.

The wireless communication network 10 as shown more particularly provides one or more transmission resources 16-1 . . . 16-N on which transmissions may be performed, e.g., in the downlink direction and/or the uplink direction. Each transmission resource 16-n from among the one or more transmission resources 16-1 . . . 16-N may be a frequency carrier, a frequency band, a part of a frequency band (e.g., a bandwidth part, BWP), a channel, a time-frequency resource, or any other type of radio resource on which wireless communication transmissions may be performed. In embodiments where there are multiple transmission resources 16-1 . . . 16-N, for example, different transmission resources 16-1 . . . 16-N may be different respective frequency carriers, different respective frequency bands, different respective parts of a frequency band, different time-frequency resources, or the like. Regardless, in some embodiments, each transmission resource 16-n is deployed in unlicensed frequency spectrum, i.e., frequency spectrum that has not been licensed to a particular network operator for exclusive use by that operator. In other embodiments, each transmission resource 16-n is deployed in shared frequency spectrum, i.e., frequency spectrum that, even if licensed to a particular network operator, has been shared by that operator for use by one or more other operators.

Regardless of the particular nature of the transmission resource(s) 16-1 . . . 16-N, before any transmission resource 16-n can be used for a transmission, a listen-before-talk (LBT) procedure must be performed in an attempt to detect or otherwise declare that transmission resource 16-n is clear of competing transmissions. Each attempt to detect or declare a transmission resource 16-n as clear using the LBT procedure is referred to as an LBT attempt. If an LBT attempt succeeds in declaring a transmission resource 16-n as clear, a transmission may be performed on that transmission resource 16-n. But if an LBT attempt fails in declaring the transmission resource 16-n as clear, the transmission must be postponed until a later LBT attempt can detect or declare the transmission resource 16-n as clear.

In this context, wireless communication equipment 18 shown in FIG. 1 rates one or more of the transmission resource(s) 16-1 . . . 16-N in terms of performance. The wireless communication equipment 18 as depicted, for example, includes a performance rater 20. The performance rater 20 obtains one or more performance ratings 22-1 . . . 22-N for one or more respective transmission resources 16-1 . . . 16-N. The performance rating 22-n for any given transmission resource 16-n rates the performance of that transmission resource 16-n, e.g., in terms of a quantitative performance metric.

The wireless communication equipment 18 exploits the performance rating(s) 22-1 . . . 22-N to control transmission on one or more of the transmission resources 16-1 . . . 16-N. As depicted, for example, the wireless communication equipment 18 further includes a transmission controller 24. The transmission controller 24 controls transmission on one or more of the transmission resources 16-1 . . . 16-N based on the respective performance rating(s) 22-1 . . . 22-N for the transmission resource(s) 16-1 . . . 16-N.

In one embodiment, for example, the transmission controller 24 adapts parameter(s) of transmission(s) on a transmission resource 16-n based on the performance rating 22-n for that transmission resource 16-n. For instance, the transmission controller 24 may adapt a modulation and coding scheme (MCS), a number of repetitions, or other parameters that impact transmission reliability on the transmission resource 16-n, based on changes in the performance rating 22-n for that transmission resource 16-n. Generally, the transmission controller 24 may make the MCS more or less robust, increase or decrease the number of repetitions, or the like, as needed to achieve a target performance level on the transmission resource 16-n.

Alternatively or additionally, the transmission controller 24 may perform transmission resource selection based on the performance rating(s) 22-1 . . . 22-N for the transmission resource(s) 16-1 . . . 16-N. For example, the transmission controller 24 may select which one or more of the transmission resource(s) 16-1 . . . 16-N to use for a transmission, based on the performance rating(s) 22-1 . . . 22-N, e.g., so as to favor selection of a transmission resource rated with higher performance. Similarly, the transmission controller 24 may perform transmission resource aggregation based on the performance rating(s) 22-1 . . . 22-N for the transmission resource(s) 16-1 . . . 16-N. For example, the transmission controller 24 may select which transmission resources 16-1 . . . 16-N to aggregate for a transmission, based on the performance rating(s) 22-1 . . . 22-N, e.g., so as to favor selection of transmission resources rated with higher performance.

No matter the particular way that the transmission controller 24 controls transmission based on the performance rating(s) 22-1 . . . 22-N, the performance rater 20 according to some embodiments determines the performance rating(s) 22-1 . . . 22-N based on observed LBT attempt outcomes. Generally, if an LBT attempt on a transmission resource 16-n succeeds in detecting the transmission resource 16-n as clear, that observed success improves the transmission resource's performance rating 22-n. By contrast, if an LBT attempt on a transmission resource 16-n fails to declare the transmission resource 16-n as clear, that observed failure diminishes the transmission resource's performance rating 22-n. Accordingly, as LBT attempts occur over time on a transmission resource 16-n, the performance rater 20 makes updates to the performance rating 22-n for that transmission resource 16-n.

In some embodiments in this regard, the performance rating 22-n for a transmission resource 16-n reflects an observed likelihood of LBT attempt success or failure on that transmission resource 16-$n$. As one example, the performance rating 22-$n$ for a transmission resource 16-$n$ may be a scalar quantity between 0 and 1 (inclusive), representing the percentage likelihood of LBT attempt success or failure observed for the transmission resource 16-$n$. Where the performance rating 22-$n$ represents the percentage likelihood of LBT attempt success, for instance, a performance rating of 0.6 may indicate that, historically, the wireless communication equipment 18 has observed a 60% likelihood of LBT attempt success on the transmission resource 16-$n$. Or, where the performance rating 22-$n$ represents the percentage likelihood of LBT attempt failure, a performance rating of 0.4 would indicate that, historically, the wireless communication equipment 18 has observed a 40% likelihood of LBT attempt failure on the transmission resource 16-$n$. Regardless, as LBT attempts occur over time on a transmission resource 16-$n$, the performance rater 20 makes updates to the performance rating 22-$n$ for that transmission resource 16-$n$ to reflect the observed likelihood of LBT attempt success or failure on the transmission resource 16-$n$.

Furthermore, the wireless communication equipment 18 according to some embodiments includes a bias controller 26. The bias controller 26 controls if and when a bias 26-$n$ is applied to the performance rating 22-$n$ for a transmission resource 16-$n$, and controls the value of that bias 26-$n$ at any given time.

More particularly, the bias controller 26 in some embodiments applies a bias 26-$n$ to a transmission resource's performance rating 22-$n$ if a failed LBT attempt on the transmission resource 16-$n$ occurs unexpectedly. To do so, the bias controller 26 monitors the outcomes of LBT attempts on the transmission resource 16-$n$, to identify if and when a failed LBT attempt on the transmission resource 16-$n$ occurs unexpectedly. A failed LBT attempt occurs unexpectedly if that failure was not the expected outcome of the LBT attempt given the historically observed likelihood of LBT attempt success and failure. The bias controller 26 may for example deem a failed LBT attempt as occurring unexpectedly if the failed LBT attempt causes, or would cause, the performance rating 22-$n$ for the transmission resource 16-$n$ to meaningfully change, e.g., by at least a threshold amount. In one such embodiment, the bias controller 26 compares the performance rating 22-$n$ before the failed LBT attempt with the performance rating after the failed LBT attempt, and determines whether the failed LBT attempt occurred unexpectedly based on that comparison. The bias controller 26 may for example determine that the failed LBT attempt occurs unexpectedly if the performance rating 22-$n$ before the failed LBT attempt reflects a higher observed likelihood of LBT attempt success on the transmission resource 16-$n$ than the performance rating 22-$n$ after the failed LBT attempt (or, equivalently, if the performance rating 22-$n$ before the failed LBT attempt reflects a lower observed likelihood of LBT attempt failure on the transmission resource 16-$n$ than the performance rating 22-$n$ after the failed LBT attempt).

In any event, responsive to such unexpected LBT attempt failure on a transmission resource 16-$n$, the bias controller 26 applies a bias 26-$n$ to that transmission resource's performance rating 22-$n$ so that the biased performance rating 22-$n$ reflects a greater likelihood of LBT attempt failure, or a smaller likelihood of LBT attempt success, than actually observed on the transmission resource 16-$n$. That is, whereas the unbiased performance rating 22-$n$ rates the transmission resource's performance in a way that reflects the actually observed likelihood of LBT attempt success or failure on the transmission resource 16-$n$, the biased performance rating 22-$n$ rates the transmission resource's performance in a way that reflects a greater likelihood of LBT attempt failure, or a smaller likelihood of LBT attempt success, than actually observed on the transmission resource 16-$n$. The bias 26-$n$ thereby effectively penalizes the performance rating 22-$n$ so as to represent the transmission resource 16-$n$ as having a worse performance (i.e., lower likelihood of LBT attempt success or higher likelihood of LBT attempt failure) than actually observed. The penalizing impact of the bias 26-$n$ accounts for the unexpected nature of the failed LBT attempt's occurrence. Indeed, the failed LBT attempt is unexpected (at least in part) because the wireless communication equipment 18 had an incorrect or incomplete expectation of LBT attempt success or failure on that transmission resource 16-$n$. The bias 26-$n$ therefore appropriately characterizes performance on the transmission resource 16-$n$ as worse than observed or expected.

However, some embodiments notably attribute the unexpected occurrence of a failed LBT attempt to sporadic or stochastic noise, e.g., from short-period noise component(s) that collied with the LBT attempt. Here, noise refers to any unwanted signal that disturbs a transmission on a transmission resource 16-$n$. The unwanted nature of the unwanted signal is from the perspective of the recipient of the transmission on the transmission resource 16-$n$. The unwanted signal may represent a competing transmission on the same transmission resource 16-$n$ or on a nearby transmission resource 16-$n$. The unwanted signal may thereby be present due to intentional transmission of the unwanted signal by a different device using the same transmission resource 16-$n$ (e.g., an LBT device of a competitor) or due to the unintentional generation of the signal without that being the intended effect or the primary goal (e.g., a microwave operating). Regardless, the sporadic or stochastic nature of the noise means that the likelihood of the noise reoccurring diminishes over time, e.g., the likelihood exponentially decays over time. This in turn means that the likelihood of another failed LBT attempt occurring unexpectedly diminishes over time.

With the unexpected occurrence of a failed LBT attempt attributed to sporadic or stochastic noise whose likelihood of reoccurrence diminishes over time, the bias controller 26 according to some embodiments correspondingly relaxes the applied bias 26-$n$ over time. That is, after the bias controller 26 applies a bias 26-$n$ to a transmission resource's performance rating 22-$n$, and the bias controller 26 relaxes the applied bias 26-$n$ over time. By relaxing the applied bias 26-$n$ over time, the bias's impact on the transmission resource's performance rating 26-$n$ decreases over time, e.g., so as to account for the time-varying impact that the sporadic or stochastic noise has on the transmission resource's performance. For example, the bias controller 26 may relax the applied bias 26-$n$ at the same rate as the rate at which the likelihood of sporadic or stochastic noise reoccurring diminishes over time. In one such embodiment, the bias controller 26 reduces a magnitude of the applied bias 26-$n$ at a rate proportional to a current magnitude of the applied bias 26-$n$, such that the magnitude of the applied bias 26-$n$ exponentially decays. In another such embodiment, the bias controller 26 periodically halves the applied bias 26-$n$. Regardless, relaxing the bias 26-$n$ over time protects the transmission resource's performance rating 22-$n$ from being penalized too heavily and/or for too long, e.g., as opposed to a fixed and/or permanent penalty that would render an otherwise high performing transmission resource unusable in the case of sporadic or stochastic noise. The performance metric 22-$n$ in these and other embodiments more accurately reflects the performance actually attainable on the transmission resource 16-$n$. Controlling transmission on the transmission resource 16-$n$ using such a performance metric may thereby improve the achievable performance, e.g., for providing services such as URLLC that require high reliability and/or low latency.

Figure 2:
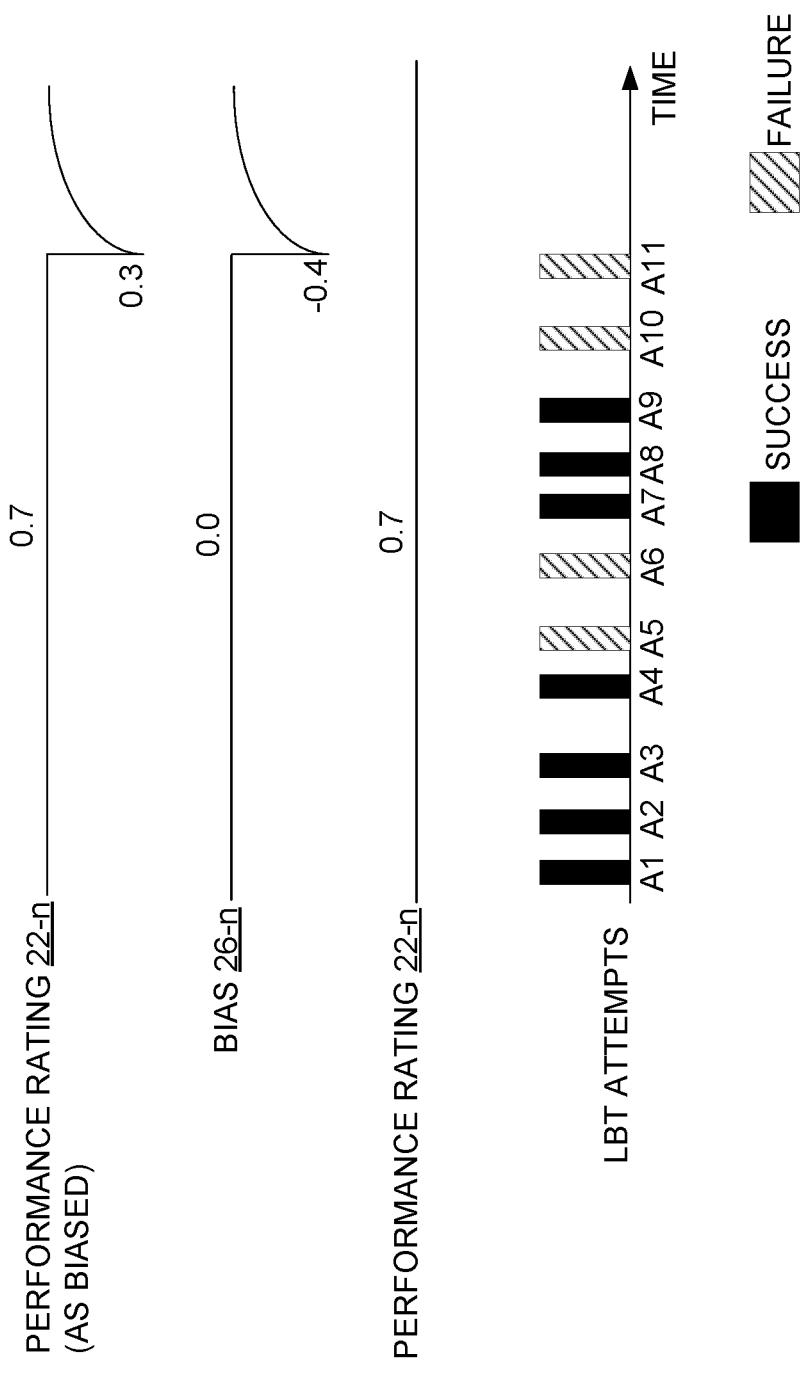
FIG. 2 is a timing diagram of performance rating biasing according to some embodiments.

FIG. 2 shows one example of how the bias controller 26 applies a bias 26-$n$ to a transmission resource's performance rating 22-$n$ and relaxes the bias 26-$n$ over time according to some embodiments. In this example, the performance rater 20 has previously made updates to the performance rating 22-$n$ for the transmission resource 16-$n$ as LBT attempts occurred over time, resulting in a steady state value of 0.7 for the performance rating 22-$n$. This value of 0.7 reflects that the performance rater 20 has observed a 70% likelihood of LBT attempt success on the transmission resource 16-$n$. With this performance rating 22-$n$ of 0.7, then, the bias controller 26 expects that 70% of the LBT attempts made on the transmission resource 16-$n$ will succeed while 30% of the LBT attempts made on the transmission resource 16-$n$ will fail. In the example of FIG. 2, this expectation is met with LBT attempts A1-A10, as 7 out of the ten LBT attempts succeed (A1-A4 and A7-A9) while 3 out of the ten LBT attempts fail (A5, A6, and A10). The failed LBT attempts A5, A6, and A10 therefore occurred expectedly because those failed LBT attempts were consistent with the transmission resource's performance rating of 0.7.

The failure of LBT attempt A11, however, occurs unexpectedly. Indeed, the expectation given the performance rating of 0.7 was that LBT attempt A11 would have succeeded, since there were already 3 out of the last 10 LBT attempts that failed. Responsive to failed LBT attempt A11 occurring unexpectedly, the bias controller 26 applies a bias 26-$n$ to the performance rating 22-$n$. As shown in this regard, the bias 26-$n$ before the unexpected failed LBT attempt was 0.0. In some sense, this may be understood as the bias controller 26 not applying any bias 26-$n$ before the unexpected failed LBT attempt, whereas in another sense this may be understood as the bias controller 26 applying a bias 26-$n$ with a value of 0.0. Either way, responsive to the unexpected failure of LBT attempt A11, the bias 26-$n$ is changed to have a value of −0.4. In some embodiments, for example, the bias controller 26 determines the magnitude of the bias 26-$n$ to initially apply (before the bias 26-$n$ is relaxed over time) as being equal to the difference between (i) an observed likelihood of LBT attempt success as of occurrence of the failed LBT attempt A11 (which is 0.7 in this example); and (ii) an observed likelihood of LBT attempt failure as of occurrence of the failed LBT attempt A11 (which is 0.3 in this example), i.e., the magnitude of the initial bias=|0.7-0.3|=|0.4| in this example. Regardless, the bias controller 26 applies the bias 26-$n$ of −0.4 to the performance rating 22-$n$ such that the performance rating 22-$n$, as biased, becomes 0.3, i.e. 0.7+(−0.4)=0.3, e.g., such that the likelihood of LBT attempt success is swapped with the likelihood of LBT attempt failure. As biased in this way, the performance rating 22-$n$ reflects a smaller likelihood of LBT attempt success (0.3) on the transmission resource 16-$n$ than actually observed. Indeed, the bias controller 26 has actually observed a likelihood of LBT attempt success greater than 30%.

FIG. 2 nonetheless shows that the bias controller 26 relaxes the bias 26-$n$ over time. In particular, the magnitude of the bias 26-$n$ as shown is reduced at a rate proportional to the current magnitude of the bias 26-$n$, such that the bias's magnitude exponentially decays. The bias controller 26 may do so for instance by periodically halving the bias 26-$n$. This way, the bias 26-$n$ gradually diminishes over time towards zero, such that the performance rating 22-$n$ as biased gradually returns to its unbiased value over time.

In some embodiments, the bias 26-$n$ is applied and relaxed over time in this way until the next LBT attempt occurs on the transmission resource 16-$n$, e.g., on the assumption that the sporadic or stochastic noise which caused the unexpected LBT attempt failure has sufficiently diminished by the next LBT attempt. In this case, when the next LBT attempt occurs, the bias controller 26 stops applying the bias 26-$n$, no matter its value at the time, such that the performance rating 22-$n$ returns to its previously unbiased state. The bias 26-$n$ thereby biases the performance rating 22-$n$ in the interim between LBT attempts.

Figure 3A:
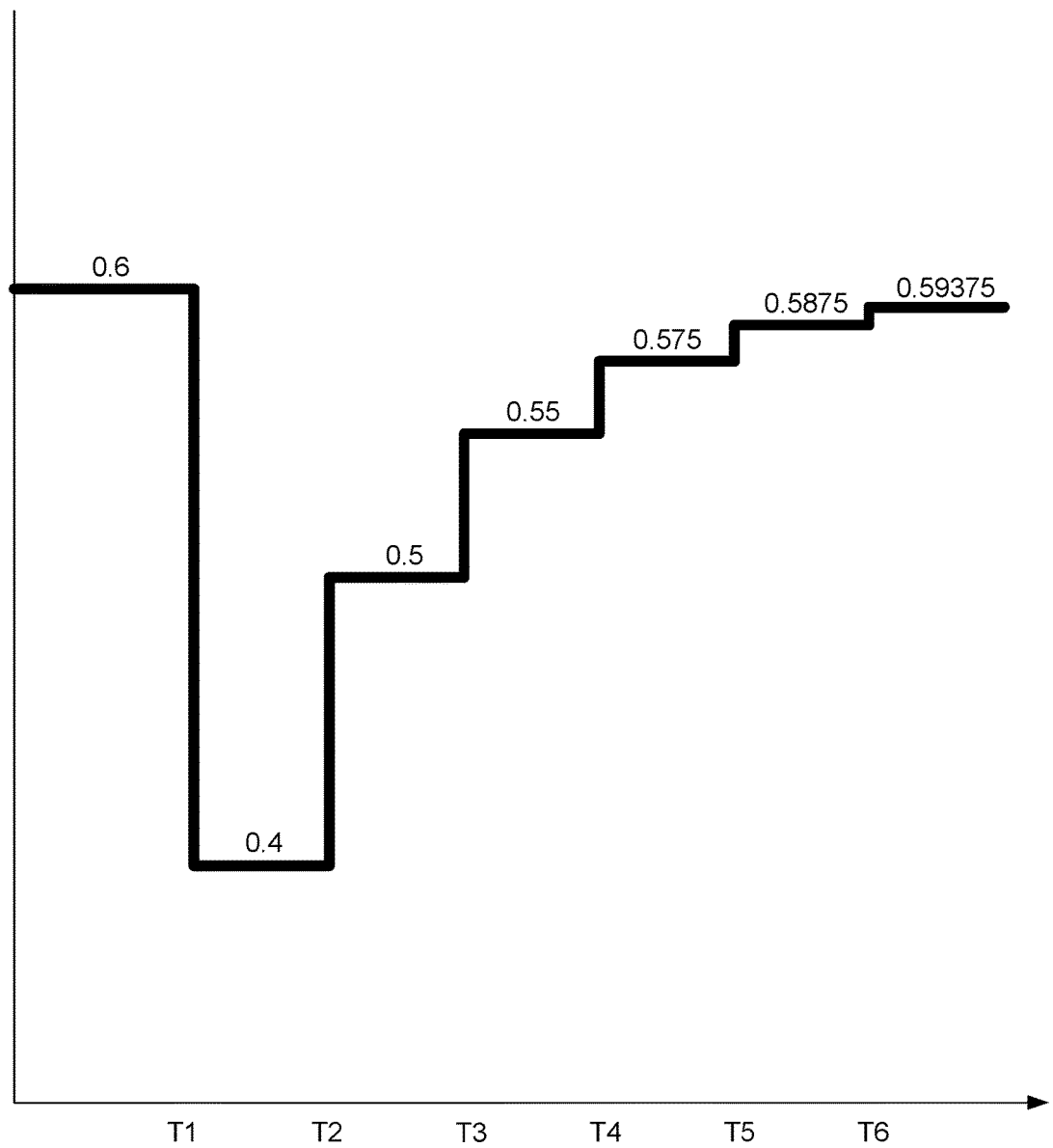
FIG. 3A is a timing diagram of relaxation of a performance rating bias according to some embodiments.
Figure 3B:
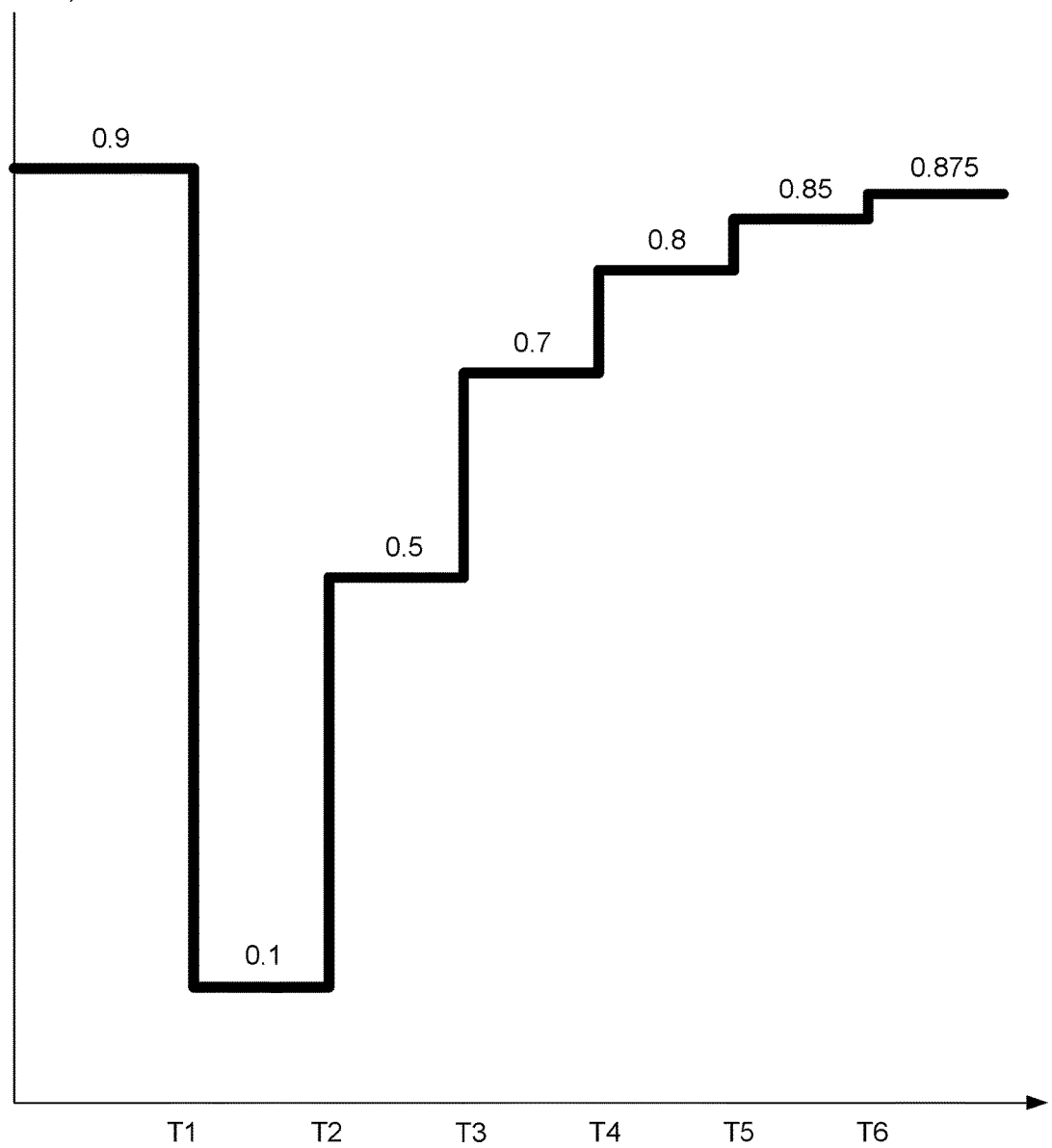
FIG. 3B is a timing diagram of relaxation of a performance rating bias according to other embodiments.

Note that, when the bias 26-$n$ is applied and relaxed as done in the example of FIG. 2, the bias 26-$n$ will penalize a higher performing transmission resource 16-$n$ more heavily than a lower performing transmission resource 16-$n$, but the increments with which the bias 26-$n$ is relaxed over time will be greater in value. FIGS. 3A-3B illustrate one example of this.

As shown in FIG. 3A, the performance rating 22-$n$ has an initial value of 0.6 before the bias 26-$n$ is applied, e.g., reflecting a 60% likelihood of LBT attempt success. Responsive to unexpected failure of an LBT attempt at time T1, a bias 26-$n$ of −0.2 is applied so that the performance rating 22-$n$ decreases to 0.4. This −0.2 bias is then periodically halved at subsequent times T2, T3, etc. so that as of time T6 the performance rating 22-$n$ has recovered to having a value of 0.59375.

By contrast, as shown in FIG. 3B, the performance rating 22-$n$ has an initial value of 0.9 before the bias 26-$n$ is applied, e.g., reflecting a 90% likelihood of LBT attempt success. Responsive to unexpected failure of an LBT attempt at time T1, a bias 26-$n$ of −0.8 is applied so that the performance rating 22-$n$ decreases to 0.1. This −0.8 bias is then periodically halved at subsequent times T2, T3, etc. so that as of time T6 the performance rating 22-$n$ has recovered to having a value of 0.875. Comparing the examples, then, the bias initially applied at time T1 is greater in FIG. 3B than in FIG. 3A because the transmission resource 16-$n$ was rated as higher performing in FIG. 3B (90% likelihood of LBT attempt success vs. 60% likelihood of LBT attempt success). But the bias is relaxed in higher value increments in FIG. 3B than in FIG. 3A.

Figure 4:
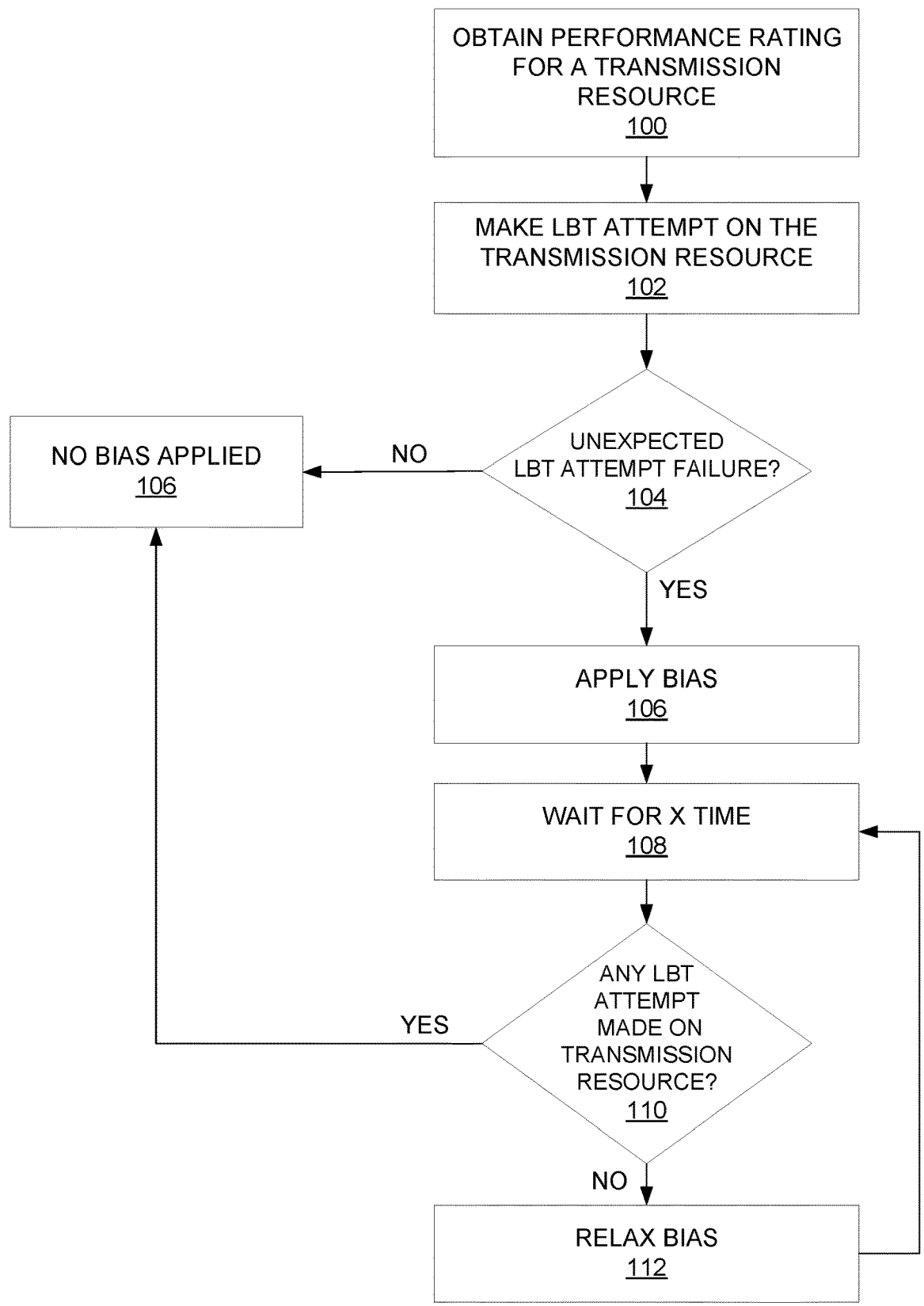
FIG. 4 is a logic flow diagram of a method for rating performance of a transmission resource based on LBT attempt outcomes according to some embodiments.

FIG. 4 shows one example algorithm implemented by the wireless communication equipment 18 according to some embodiments herein. As shown, the wireless communication equipment 18 obtains a performance rating 22-$n$ for a transmission resource 16-$n$ (Block 100), e.g., based on observing the outcome of LBT attempts made on the transmission resource 16-$n$. The wireless communication equipment 18 at some point thereafter makes an LBT attempt on the transmission resource 16-$n$ (Block 102). If the LBT attempt succeeded, or if the LBT attempt failed but the failure was expected, (NO at Block 104), the wireless communication equipment 18 does not bias the performance rating 22-$n$. On the other hand, if the LBT attempt failed unexpectedly (YES at Block 104), the wireless communication equipment 18 applies a bias 26-$n$ to the performance rating 22-$n$ for the transmission resource 16-$n$ (Block 106). The wireless communication equipment 18 then waits for a certain time X (Block 108), e.g., as supervised by a timer with a configurable value X. If no further LBT attempt was made on the transmission resource 16-$n$ during that time (NO at Block 110), the wireless communication equipment 18 relaxes the applied bias 26-$n$ (Block 112). On the other hand, if an LBT attempt was made on the transmission resource 16-*n* (YES at Block 110), the wireless communication equipment 18 stops applying the bias 26-*n* (Block 106). According to the algorithm in FIG. 4, then, the wireless communication equipment 18 periodically relaxes the bias 112 more and more at each time interval X (Blocks 108-112) until a further LBT attempt is made on the transmission resource 16-*n*.

In these and other embodiments, the wireless communication equipment 18 herein effectively penalizes the performance rating 22-*n* for a transmission resource 16-*n* if the transmission resource 16-*n* performs worse than how it was rated, i.e., so as to penalize its wrong assessment of the transmission resource's performance. The wireless communication equipment 18 however implements a penalty relaxation technique, e.g., based on an assumption that the transmission resource 16-*n* performed worse than how it was rated because of an underlying noise source that was sporadic or stochastic in nature. This protects the transmission resource 16-*n* from being over penalized for cases that an LBT attempt failed because of a sporadic or stochastic noise source.

Some embodiments prove advantageous in improving system performance, such as by improving capacity utilization and/or LBT attempt success. In one or more embodiments, the increased LBT success rate also leads to additional system resource utilization efficiency improvements. Alternatively or additionally, some embodiments may be used for meeting high reliability targets and/or protecting a transmission resource from being blacklisted due to poor performance.

Note that, although some embodiments above were described with respect to a certain transmission resource 16-*n* and a certain performance rating 22-*n* for that transmission resource 16-*n*, the embodiments herein may be applied to each of multiple transmission resources 16-1 ... 16-N. For example, the wireless communication equipment 18 may maintain/update a respective performance rating 22-1 ... 22-N for each of multiple transmission resources 16-1 ... 16-N, based on the LBT attempt successes and failures on that transmission resource. And, the wireless communication equipment 18 may apply respective biases 26-1 ... 26-N to the performance ratings 22-1 ... 22-N for the transmission resources 16-1 ... 16-N. Furthermore, the wireless communication equipment 18 may control transmission on the transmission resources 16-1 ... 16-N based on the respective performance ratings 22-1 ... 22-N for those transmission resources 16-1 ... 16-N.

Note further that the wireless communication equipment 18 herein may be any equipment 18 that is in or operable with the wireless communication network 10. In fact, in some embodiments, the wireless communication equipment 18 is a wireless device 12 (e.g., user equipment, UE). In this case, the wireless device 12 may autonomously control transmission on a transmission resource 16-*n* based on the performance metric 22-*n* for that transmission resource 16-*n*. For example, the wireless device 12 may decide whether or not to use a transmission resource 16-*n* for performing an uplink transmission, based on the performance rating 22-*n* for that transmission resource 16-*n*, e.g., as part of a decision about which one or more of the transmission resource(s) 16-1 ... 16-N to use and/or aggregate for the transmission. In these and other embodiments, the wireless device 12 may directly observe the outcome of LBT attempts that the wireless device 12 itself makes on a transmission resource 16-*n*.

In other embodiments, by contrast, the wireless communication equipment 18 is network equipment 14 in the wireless communication network 10. The network equipment 14 may for instance be network equipment serving the wireless device 12. In one or more such embodiments, the network equipment 14 may control transmission on a transmission resource 16-*n* based on the performance metric 22-*n* for that transmission resource 16-*n*. For example, the network equipment 14 may decide whether or not to use a transmission resource 16-*n* for performing a downlink transmission to the wireless device 12, based on the performance rating 22-*n* for that transmission resource 16-*n*, e.g., as part of a decision about which one or more of the transmission resource(s) 16-1 ... 16-N to use and/or aggregate for the transmission. As another example, the network equipment 14 may decide whether or not the wireless device 12 is to use a transmission resource 16-*n* for performing an uplink transmission from the wireless device 12, based on the performance rating 22-*n* for that transmission resource 16-*n*, e.g., as part of a decision about which one or more of the transmission resource(s) 16-1 ... 16-N to assign/allocate to the wireless device 12 for use in making the transmission. In one such embodiment, the network equipment 14 may assign one or more transmission resources 16-1 ... 16-N to the wireless device 14 based on the respective performance rating(s) 22-1 ... 22-N for the transmission resource(s) 16-1 ... 16-N. In determining how many transmission resources 16-1 ... 16-N to assign to the wireless device 14, the network equipment 18 may also take into account a reliability target and/or the size of the transmission to be sent. The network equipment 14 may for instance take into account the quality of service requirements of the traffic to be transmitted (e.g., URLLC traffic), as well as the performance rating(s) 22-1 ... 22-N for the respective transmission resources 16-1 ... 16-N, in choosing how many and/or the most suitable transmission resource(s) 16-1 ... 16-N to assign to the wireless device 12 for transmission. In this regard, the network equipment 14 may avoid assigning a transmission resource if its performance rating is below a certain threshold, depending on the quality of service requirements, and instead assign a different transmission resource whose performance rating is above the certain threshold.

As another example, the network equipment 14 may configure the wireless device 12 with certain transmission parameters (e.g., a number of repetitions, a coverage enhancement level, dual connectivity, or some other method that impacts transmission reliability) based on the performance rating(s) 22-1 ... 22-N of the respective transmission resources 16-1 ... 16-N on which transmission is to be performed. For instance, the network equipment 14 may configure the wireless device 12 to repeat the transmission on a transmission resource a certain number of times if the performance rating for that transmission resource is below a certain level or factor.

As still another example the network equipment 14 may avoid configuring one or more transmission resources to other wireless device, in case the network equipment 14 expects the wireless device 12 to require additional transmissions in those transmission resource(s) due to the fact that an initial transmission by the wireless device 12 in the transmission resource(s) assigned to the wireless device 12 may fail. This may be the case for instance if the LBT success rate is below a certain level, e.g., 0.5. The network equipment 14 in this regard may reserve two or more subsequent transmission resources to the wireless device 12 instead of reserving subsequent transmission resources to other wireless devices.

In some embodiments where the wireless communication equipment 18 is network equipment 14 but the LBT attempts on a transmission resource 16-$n$ are made by a wireless device 12, the network equipment 14 may indirectly observe the outcome of those LBT attempts made by the wireless device 12. The network equipment 14 may for example receive control signaling that explicitly or implicitly indicates the LBT attempt outcomes. Or, in other embodiments, the network equipment 14 may infer the outcome of uplink transmission LBT attempts made by the wireless device 12, based on whether the network equipment 14 receives uplink transmissions that required successful LBT attempts in order to be performed and/or based on a timing with which the network equipment 14 receives such uplink transmissions. In this regard, the network equipment 14 infers an LBT attempt on a transmission resource 16-$n$ was successful if the network equipment 14 receives an uplink transmission from the wireless device 12 on that transmission resource 16-$n$ within a certain amount of time since the uplink transmission was scheduled to occur. By contrast, if the network equipment 14 does not receive an uplink transmission from the wireless device 12 on the transmission resource 16-$n$ within the certain amount of time, or at all, the network equipment 14 infers that the LBT attempt on the transmission resource 16-$n$ failed. Indeed, the longer delay implies that one or more initial LBT attempts failed, e.g., due to congestion on the transmission resource, since LBT attempt failure causes larger and larger backoff counter values. In this case, then, the network equipment 14 is able to observe LBT attempt outcomes, and corresponding transmission resource quality, without active or dedicated signaling.

Figure 5:
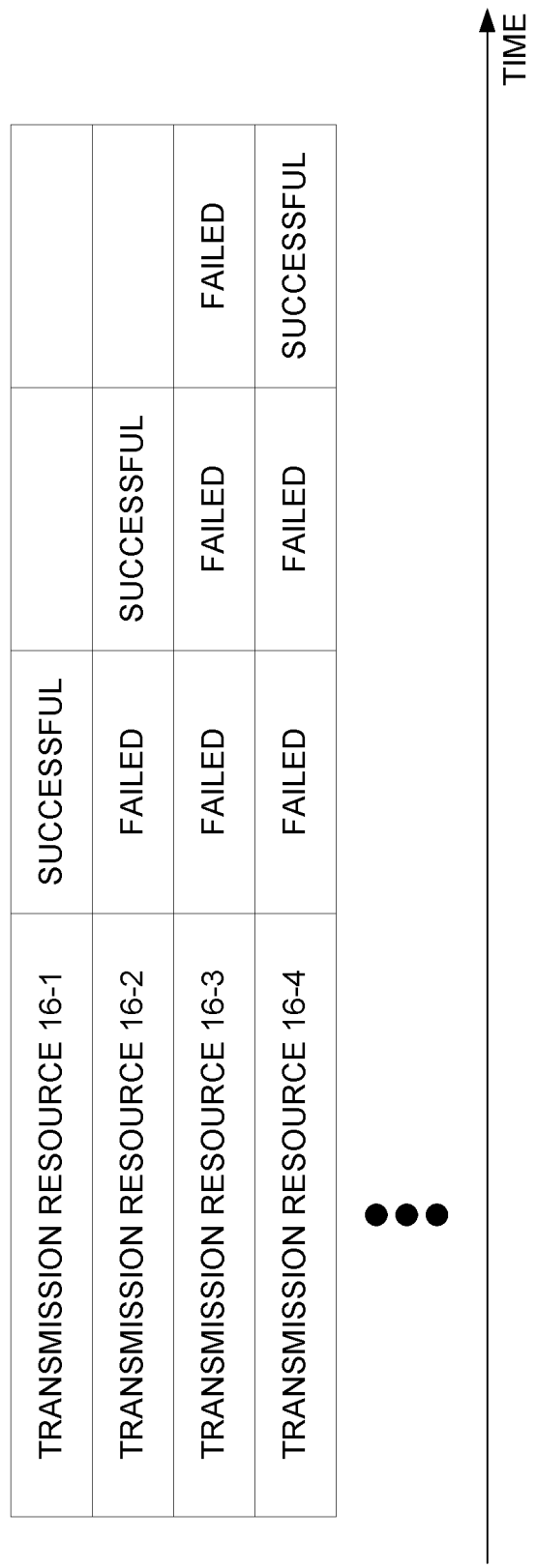
FIG. 5 is a table of instantaneous LBT attempt outcomes over time according to some embodiments.

In these and other embodiments, the wireless communication equipment 18 may calculate statistics about the LBT attempt outcomes based on direct or indirect observations of the success and failure of LBT attempts. In some embodiments, for example, the wireless communication equipment 18 builds an instantaneous LBT outcome table as shown in FIG. 5, from the outcomes of LBT attempts on the transmission resource(s) 16-1 . . . 16-N. The wireless communication equipment 18 may then use this table to estimate the likelihood of LBT attempt success or failure on each transmission resource, e.g., for determining the performance rating(s) 22-1 . . . 22-N. The likelihood of LBT attempt success on a certain transmission resource may for instance be calculated as the ratio of the number of successful LBT attempts to the total number of LBT attempts on the transmission resource.

Note that, in some embodiments, herein each performance rating 22-$n$ is specific to a certain wireless device 12. In this case, each performance rating 22-$n$ is selectively updated based on LBT attempts made on the transmission resource 16-$n$ for a transmission to or from that certain wireless device 12. In other embodiments, by contrast at least one performance rating 22-$n$ is common across multiple wireless devices. In this case, such performance rating may be updated based on LBT attempts made on the transmission resource 16-$n$ for a transmission to or from any of the multiple wireless devices.

Note also that, in some embodiments, responsive to a failed LBT attempt occurring unexpectedly on a transmission resource 16-$n$, the performance rating 22-$n$ for that transmission resource 16-$n$ is updated to reflect the failed LBT attempt and then the bias 22-$n$ is applied to the performance rating 22-$n$ as updated. In other embodiments, by contrast, the performance rating 22-$n$ for that transmission resource 16-$n$ is not updated to reflect a failed LBT attempt that occurs unexpectedly, such that the bias 22-$n$ is applied to the performance rating 22-$n$ as in existence prior to the unexpected LBT attempt failure.

Note further that listen-before-talk as used herein broadly refers to any mechanism for assessing whether a transmission resource is clear as a prerequisite for performing a transmission on that transmission resource. Such mechanism may for instance involve carrier sensing, energy detection, clear channel assessment, or the like. In one embodiment, listen-before-talk is implemented as specified in ETSI EN 300 328 V.2.2.1, but this need not be the case. Regardless, as used herein, an LBT attempt on a transmission resource correspondingly refers to an attempt to assess the transmission resource as clear using any mechanism (e.g., carrier sensing, energy detection, clear channel assessment, etc.). Here, the success of an LBT attempt means that the attempt succeeded in assessing the transmission resource as clear, so that a transmission is allowable on the transmission resource. By contrast, the failure of an LBT attempt means that the attempt failed to assess the transmission resource as clear, so that a transmission is prohibited on the transmission resource.

Figure 6:
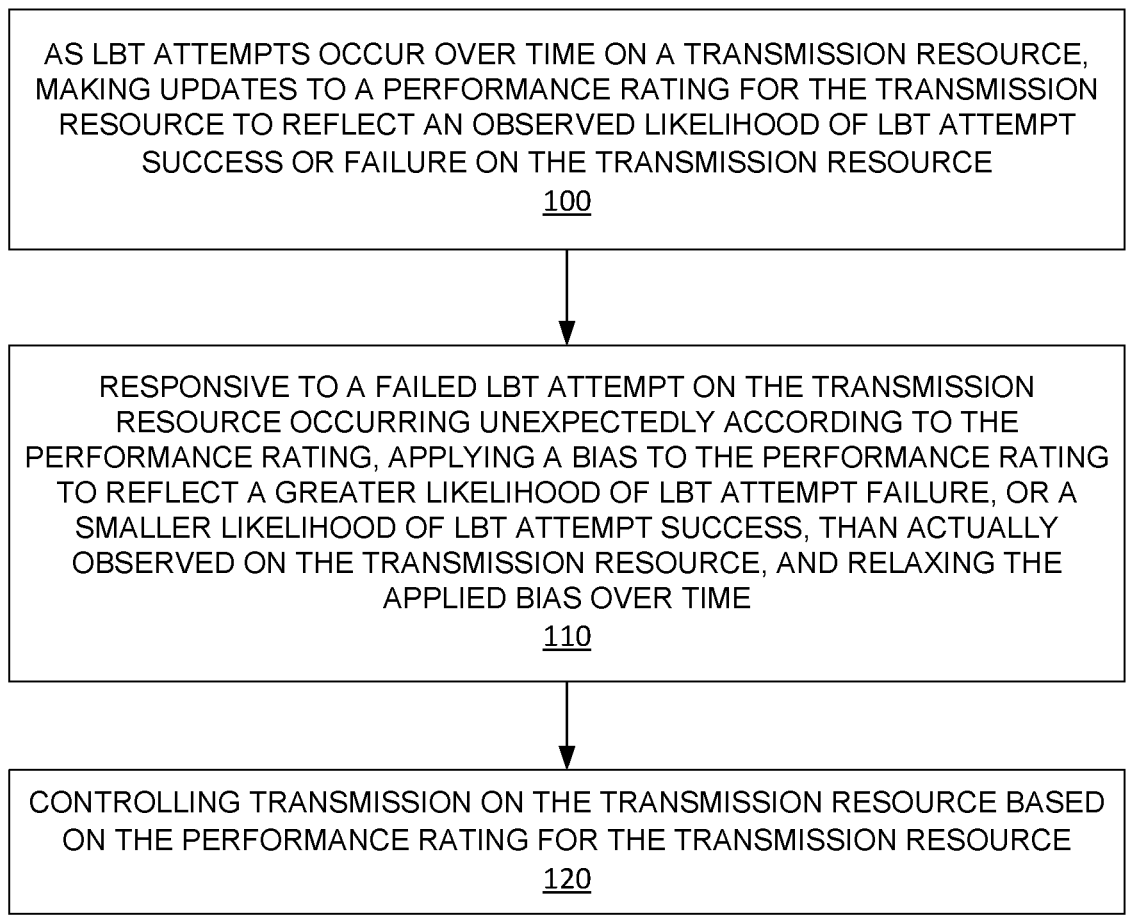
FIG. 6 is a logic flow diagram of a method performed by wireless communication equipment according to some embodiments.

In view of the above modifications and variations, FIG. 6 depicts a method performed by wireless communication equipment 18 configured for use in a wireless communication network 10 in accordance with particular embodiments. The method includes, as LBT attempts occur over time on a transmission resource 16-$n$, making updates to a performance rating 22-$n$ for the transmission resource 16-$n$ to reflect an observed likelihood of LBT attempt success or failure on the transmission resource 16-$n$ (Block 100). The method also comprises, responsive to a failed LBT attempt on the transmission resource 16-$n$ occurring unexpectedly according to the performance rating 22-$n$, applying a bias 26-$n$ to the performance rating 22-$n$ to reflect a greater likelihood of LBT attempt failure, or a smaller likelihood of LBT attempt success, than actually observed on the transmission resource 16-$n$, and relaxing the applied bias 26-$n$ over time (Block 110). In some embodiments, the method further comprises controlling transmission on the transmission resource 16-$n$ based on the performance rating 22-$n$ for the transmission resource 16-$n$ (Block 120).

In some embodiments, a magnitude of the bias 26-$n$ initially applied to the performance rating 22-1 . . . 22-N, before the applied bias 26-$n$ is relaxed over time, is equal to a difference between an observed likelihood of LBT attempt success as of occurrence of the failed LBT attempt and an observed likelihood of LBT attempt failure as of occurrence of the failed LBT attempt.

In some embodiments, relaxing the applied bias 26-$n$ over time comprises reducing a magnitude of the applied bias 26-$n$ at a rate proportional to a current magnitude of the applied bias 26-$n$ such that a magnitude of the applied bias 26-$n$ exponentially decays.

In some embodiments, relaxing the applied bias 26-$n$ over time comprises periodically halving the bias 26-$n$ to apply to the performance rating 22-1 . . . 22-N.

In some embodiments, applying the bias 26-$n$ comprises applying the bias 26-$n$ to the performance rating 22-1 . . . 22-N until the next LBT attempt occurs on the transmission resource 16-1 . . . 16-N.

In some embodiments, the transmission resource 16-1 . . . 16-N is an unlicensed frequency carrier.

In some embodiments, the wireless communication equipment 18 is a radio network node. In some embodiments, the transmission resource 16-1 . . . 16-N is an uplink transmission resource 16-1 . . . 16-N and the LBT attempts are uplink LBT attempts made by a wireless device.

In some embodiments, the performance rating 22-1 . . . 22-N is specific to a certain wireless device and is selectively updated based on LBT attempts made on the transmission resource 16-1 . . . 16-N for a transmission to or from the certain wireless device. In other embodiments, the performance rating 22-1 . . . 22-N is common across multiple wireless devices and is updated based on LBT attempts made on the transmission resource 16-1 . . . 16-N for a transmission to or from any of the multiple wireless devices.

In some embodiments, the method further comprises determining whether a failed LBT attempt on the transmission resource 16-1 . . . 16-N occurs unexpectedly according to the performance rating 22-1 . . . 22-N by comparing the performance rating 22-1 . . . 22-N before the failed LBT attempt with the performance rating 22-1 . . . 22-N after the failed LBT attempt. The method further comprises determining whether a failed LBT attempt on the transmission resource 16-1 . . . 16-N occurs unexpectedly according to the performance rating 22-1 . . . 22-N by determining whether or not the failed LBT attempt on the transmission resource 16-1 . . . 16-N occurs unexpectedly, based on said comparing.

In some embodiments, the method further comprises determining that the failed LBT attempt on the transmission resource 16-1 . . . 16-N occurs unexpectedly if the performance rating 22-1 . . . 22-N before the failed LBT attempt reflects a higher observed likelihood of LBT attempt success on the transmission resource 16-1 . . . 16-N than the performance rating 22-1 . . . 22-N after the failed LBT attempt. Alternatively, the method further comprises determining that the failed LBT attempt on the transmission resource 16-1 . . . 16-N occurs unexpectedly if the performance rating 22-1 . . . 22-N before the failed LBT attempt reflects a lower observed likelihood of LBT attempt failure on the transmission resource 16-1 . . . 16-N than the performance rating 22-1 . . . 22-N after the failed LBT attempt.

In some embodiments, controlling transmission on the transmission resource 16-1 . . . 16-N comprises performing transmission resource selection. Additionally or alternatively, controlling transmission on the transmission resource 16-1 . . . 16-N comprises transmission resource aggregation. Additionally or alternatively, controlling transmission on the transmission resource comprises transmission parameter adaptation.

In some embodiments, the method comprises performing this updating, applying, relaxing, and controlling for each of multiple transmission resources 16-1 . . . 16-N. In one or more such embodiments, said controlling is performed based on the respective performance ratings 22-1 . . . 22-N for the multiple transmission resources 16-1 . . . 16-N.

Embodiments herein also include corresponding wireless communication equipment 18. Embodiments herein for instance include wireless communication equipment 18 configured to perform any of the steps of any of the embodiments described above for the wireless communication equipment 18.

Embodiments also include wireless communication equipment 18 comprising processing circuitry and power supply circuitry. The processing circuitry is configured to perform any of the steps of any of the embodiments described above for the wireless communication equipment 18. The power supply circuitry is configured to supply power to the wireless communication equipment 18.

Embodiments further include wireless communication equipment 18 comprising processing circuitry. The processing circuitry is configured to perform any of the steps of any of the embodiments described above for the wireless communication equipment 18. In some embodiments, the wireless communication equipment 18 further comprises communication circuitry.

Embodiments further include wireless communication equipment 18 comprising processing circuitry and memory. The memory contains instructions executable by the processing circuitry whereby the wireless communication equipment 18 is configured to perform any of the steps of any of the embodiments described above for the wireless communication equipment 18.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless communication equipment 18. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
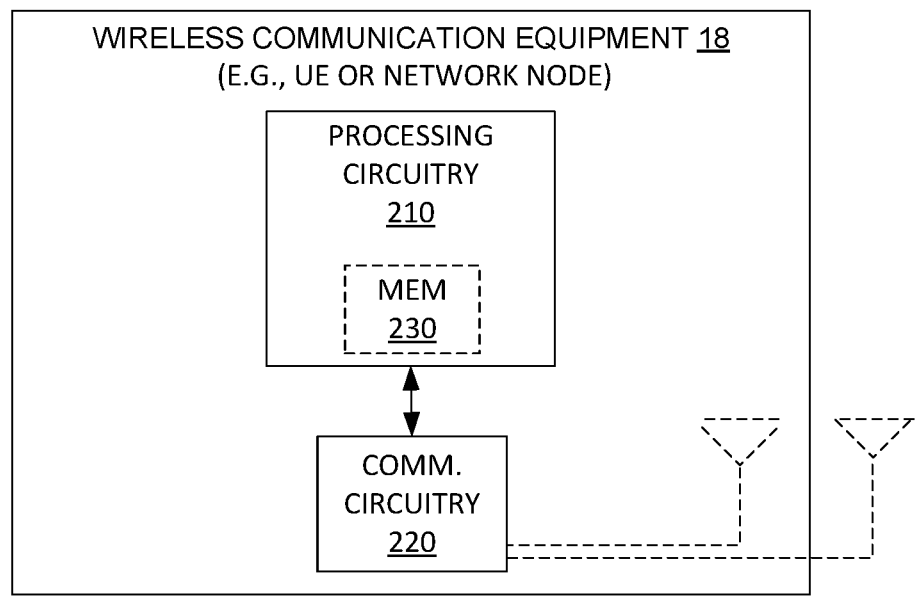
FIG. 7 is a block diagram of wireless communication equipment according to some embodiments.

FIG. 7 for example illustrates wireless communication equipment 18 (e.g., wireless device 12 or network equipment 14) as implemented in accordance with one or more embodiments. As shown, the wireless communication equipment 18 includes processing circuitry 210 and communication circuitry 220. The communication circuitry 220 (e.g., radio circuitry) is configured to transmit and/or receive information to and/or from one or more other nodes, e.g., via any communication technology. Such communication may occur via one or more antennas that are either internal or external to the wireless communication equipment 18. The processing circuitry 210 is configured to perform processing described above, e.g., in FIG. 6, such as by executing instructions stored in memory 230. The processing circuitry 210 in this regard may implement certain functional means, units, or modules.

Those skilled in the art will also appreciate that embodiments herein further include corresponding computer programs.

A computer program comprises instructions which, when executed on at least one processor of wireless communication equipment 18, cause the wireless communication equipment 18 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of wireless communication equipment 18, cause the wireless communication equipment 18 to perform as described above.

Embodiments further include a computer program product comprising program code portions for performing the steps of any of the embodiments herein when the computer program product is executed by wireless communication equipment 18. This computer program product may be stored on a computer readable recording medium.

Figure 8:
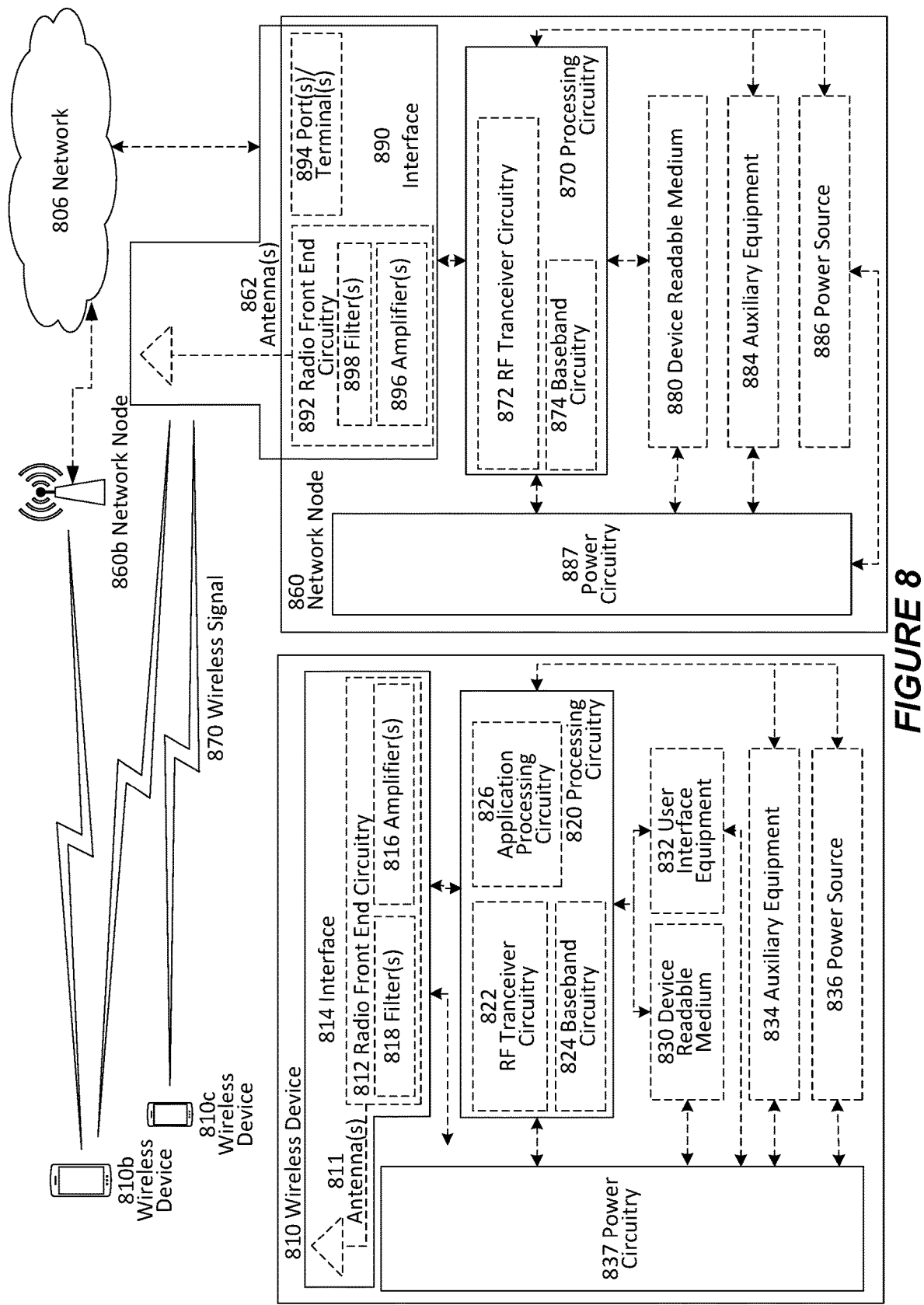
FIG. 8 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
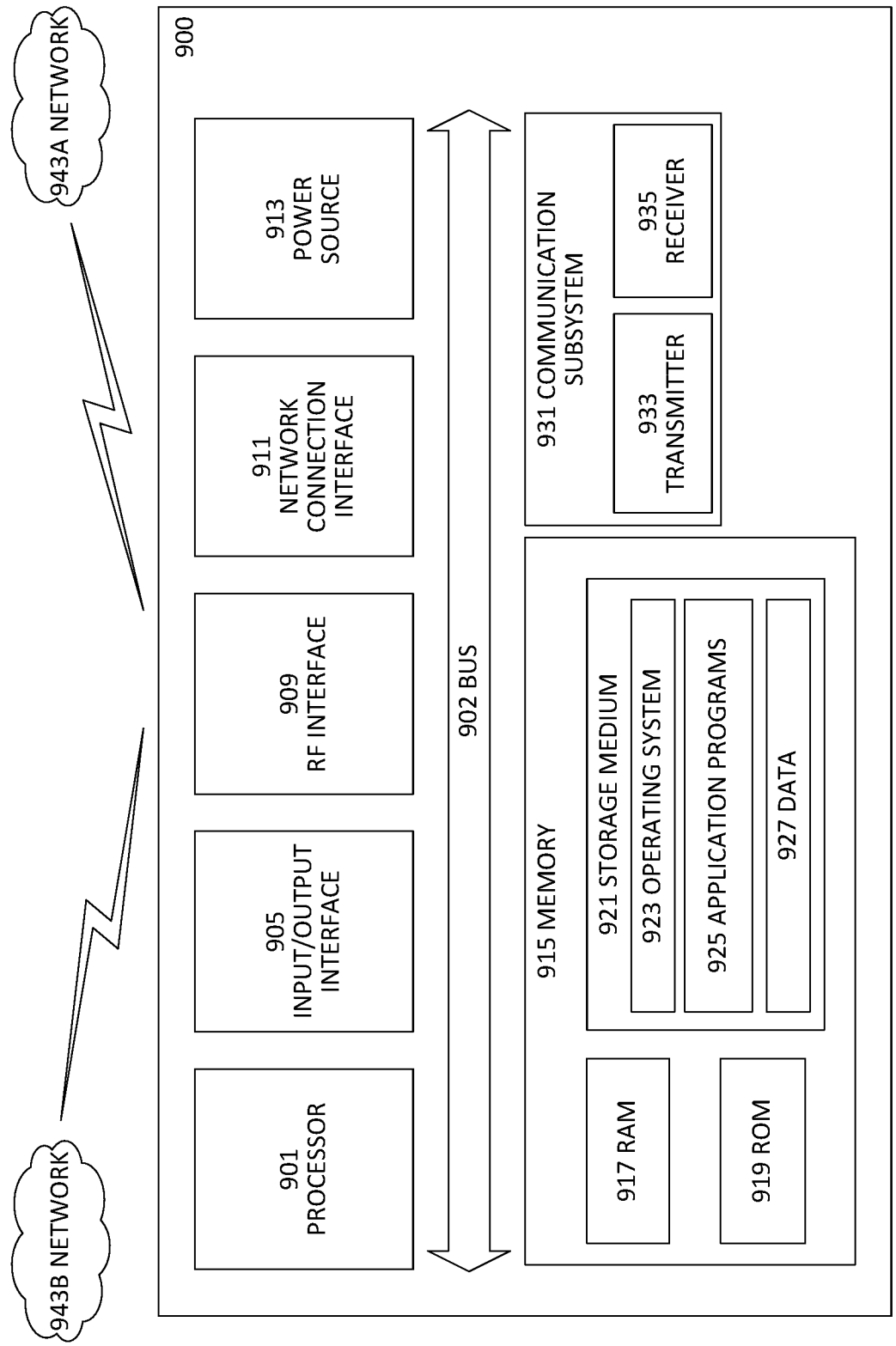
FIG. 9 is a block diagram of a user equipment according to some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
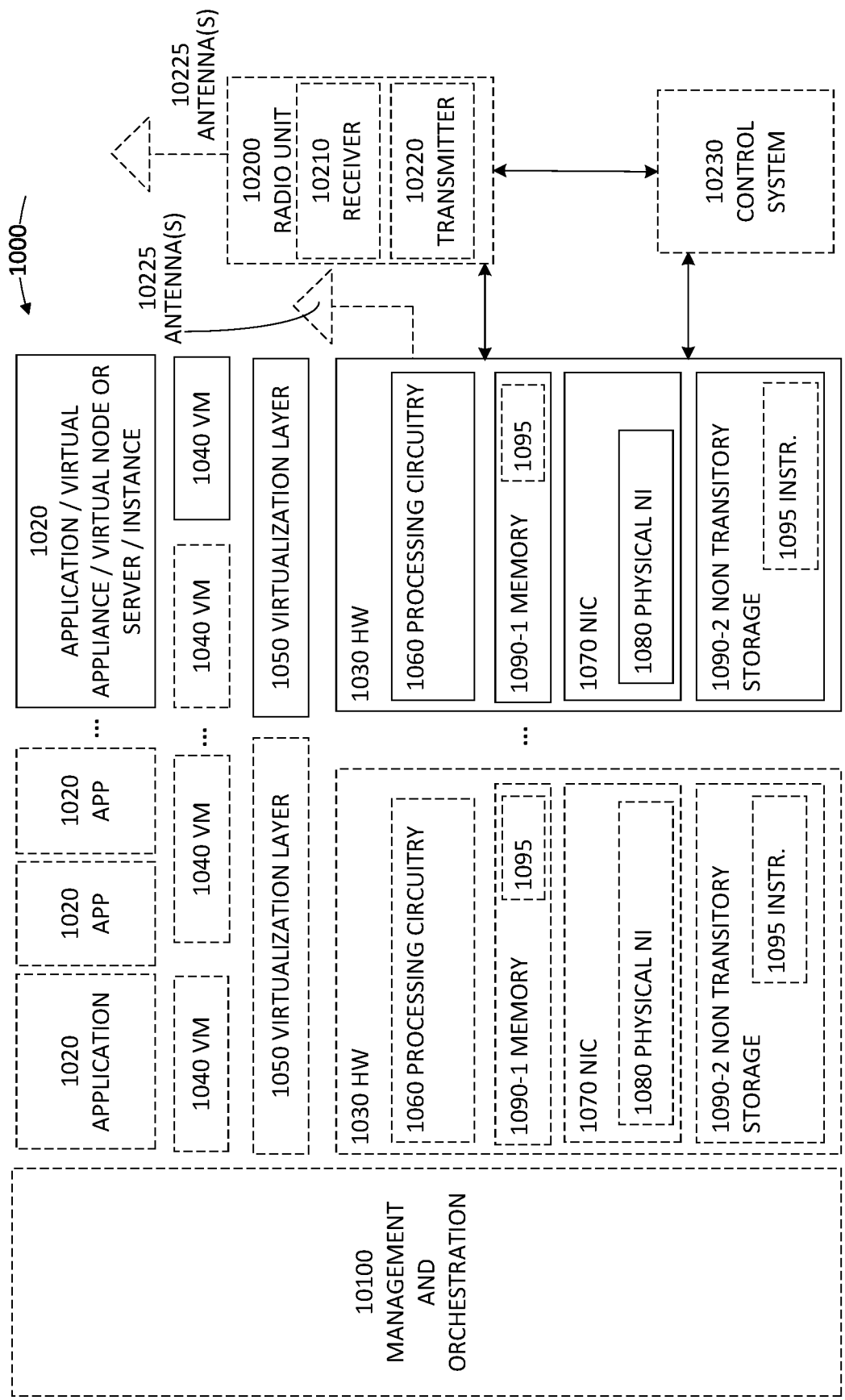
FIG. 10 is a block diagram of a virtualization environment according to some embodiments.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Figure 11:
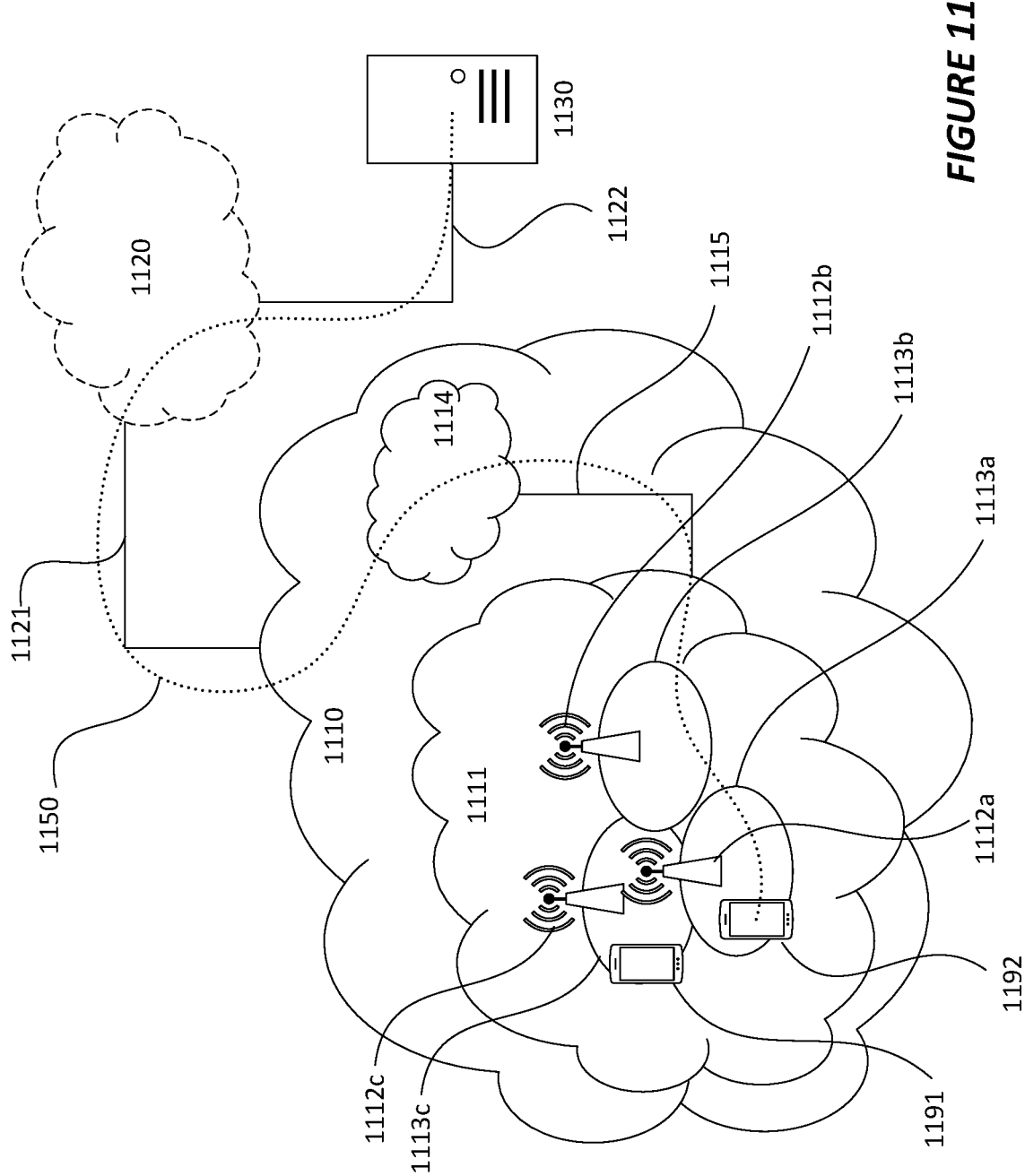
FIG. 11 is a block diagram of a communication network with a host computer according to some embodiments.

FIG. 11 illustrates a telecommunication network connected via an intermediate network to a host computer in accordance with some embodiments. In particular, with reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Figure 12:
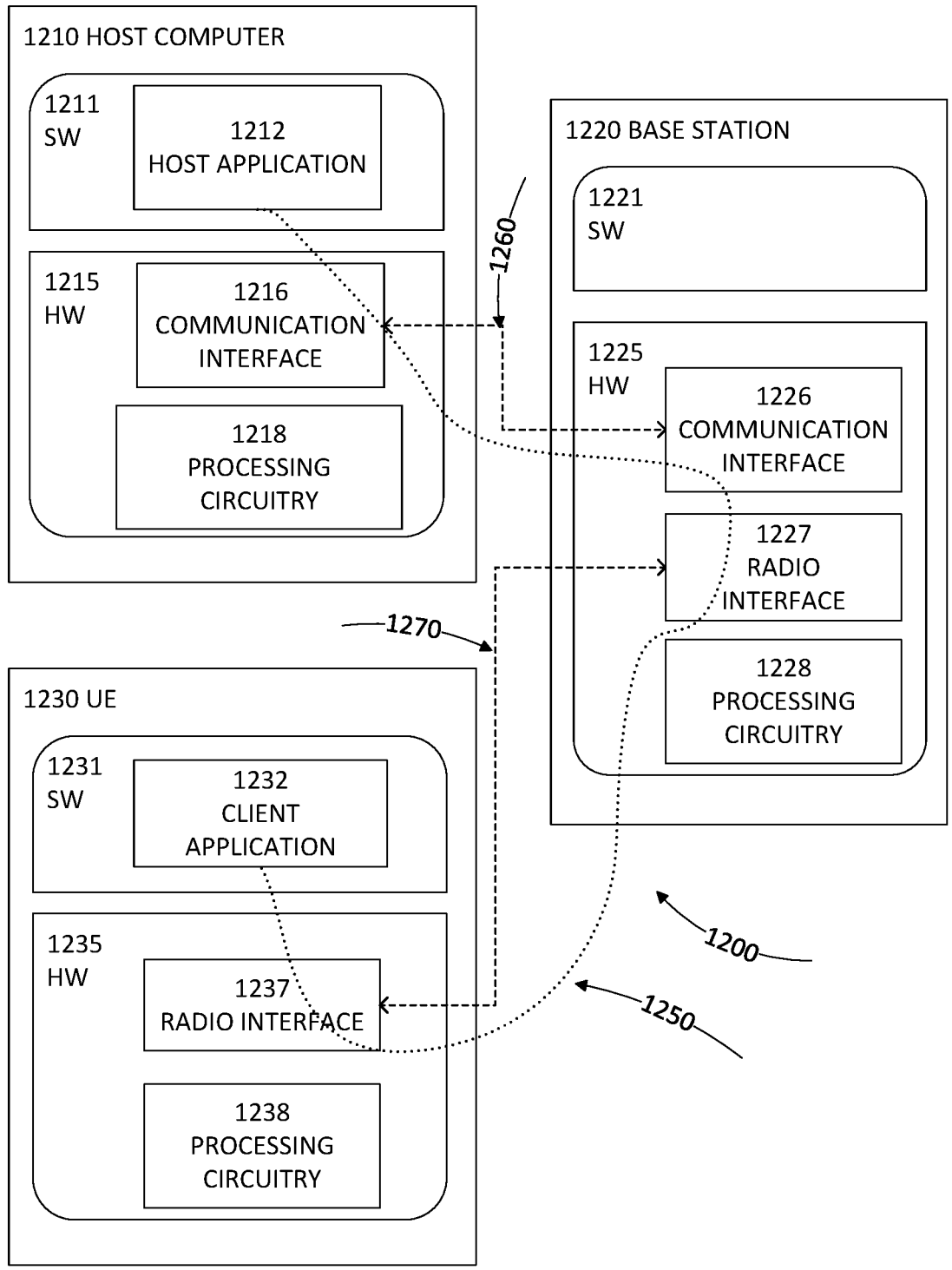
FIG. 12 is a block diagram of a host computer according to some embodiments.

Example implementations, in accordance with an embodiment, of the UE, base station and host computer discussed in the preceding paragraphs will now be described with reference to FIG. 12. FIG. 12 illustrates host computer communicating via a base station with a user equipment over a partially wireless connection in accordance with some embodiments In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
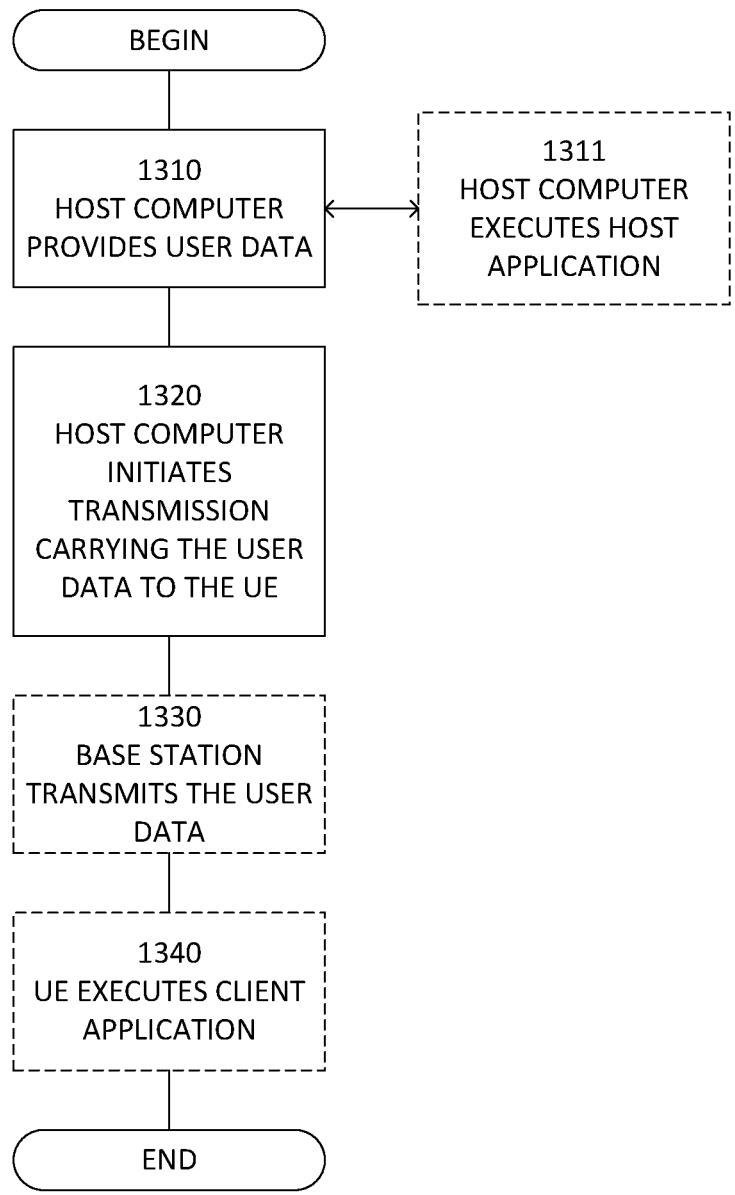
FIG. 13 is a flowchart illustrating a method implemented in a communication system, in accordance with one embodiment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
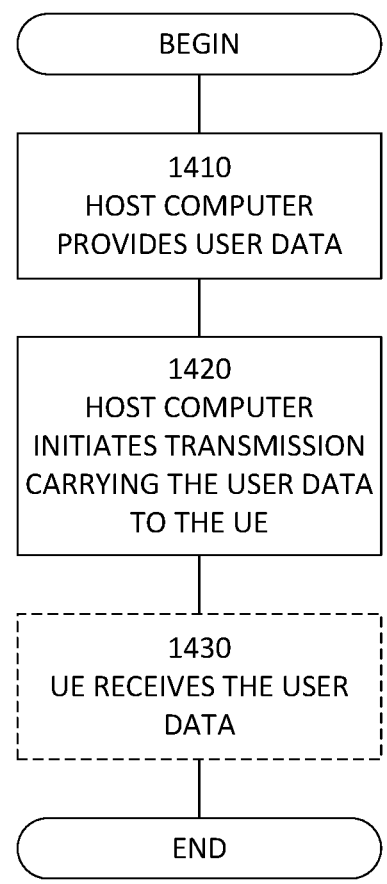
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
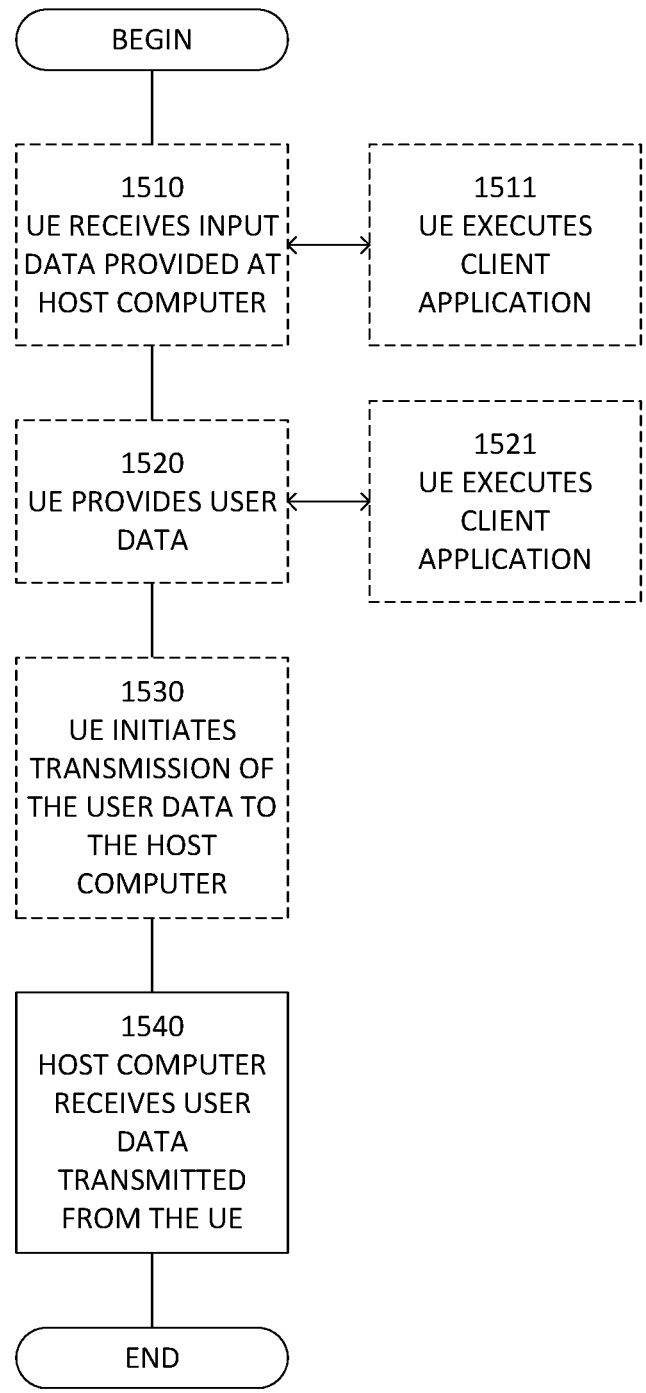
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
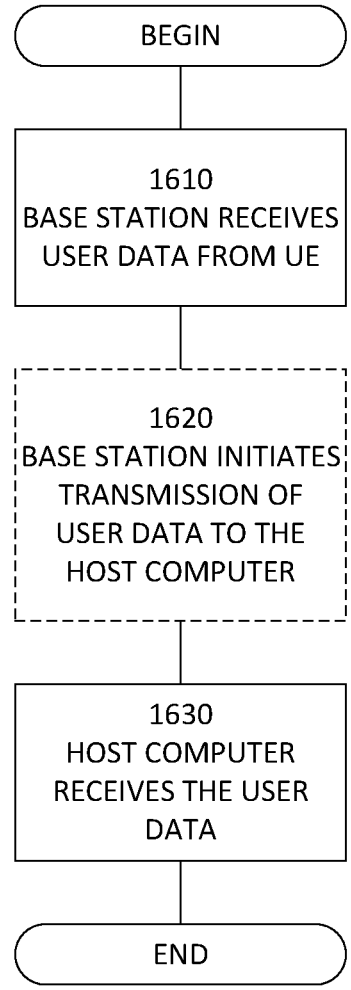
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by wireless communication equipment configured for use in a wireless communication network, the method comprising:
   as listen-before-talk (LBT) attempts occur over time on a transmission resource, making updates to a performance rating for the transmission resource to reflect an observed likelihood of LBT attempt success or failure on the transmission resource;
   responsive to a failed LBT attempt on the transmission resource occurring unexpectedly according to the performance rating, applying a bias to the performance rating to reflect a greater likelihood of LBT attempt failure, or a smaller likelihood of LBT attempt success, than actually observed on the transmission resource, and relaxing the applied bias over time; and
   controlling transmission on the transmission resource based on the performance rating for the transmission resource.

2. The method of claim 1, wherein a magnitude of the bias initially applied to the performance rating, before the applied bias is relaxed over time, is equal to a difference between:
   an observed likelihood of LBT attempt success as of occurrence of the failed LBT attempt; and
   an observed likelihood of LBT attempt failure as of occurrence of the failed LBT attempt.

3. The method of claim 1, wherein relaxing the applied bias over time comprises reducing a magnitude of the applied bias at a rate proportional to a current magnitude of the applied bias such that a magnitude of the applied bias exponentially decays.

4. The method of claim 1, wherein relaxing the applied bias over time comprises periodically halving the bias to apply to the performance rating.

5. The method of claim 1, wherein applying the bias comprises applying the bias to the performance rating until the next LBT attempt occurs on the transmission resource.

6. The method of claim 1, wherein:
   the performance rating is specific to a certain wireless device and is selectively updated based on LBT attempts made on the transmission resource for a transmission to or from the certain wireless device; or
   the performance rating is common across multiple wireless devices and is updated based on LBT attempts made on the transmission resource for a transmission to or from any of the multiple wireless devices.

7. The method of claim 1, further comprising determining whether a failed LBT attempt on the transmission resource occurs unexpectedly according to the performance rating by:
   comparing the performance rating before the failed LBT attempt with the performance rating after the failed LBT attempt; and
   determining whether or not the failed LBT attempt on the transmission resource occurs unexpectedly, based on said comparing.

8. The method of claim 1, further comprising either:
   determining that the failed LBT attempt on the transmission resource occurs unexpectedly if the performance rating before the failed LBT attempt reflects a higher observed likelihood of LBT attempt success on the transmission resource than the performance rating after the failed LBT attempt; or
   determining that the failed LBT attempt on the transmission resource occurs unexpectedly if the performance rating before the failed LBT attempt reflects a lower observed likelihood of LBT attempt failure on the transmission resource than the performance rating after the failed LBT attempt.

9. The method of claim 1, further comprising performing said updating, applying, relaxing, and controlling for each of multiple transmission resources, wherein said controlling is performed based on the respective performance ratings for the multiple transmission resources.

10. The method of claim 1, wherein controlling transmission on the transmission resource comprises performing transmission resource selection, transmission resource aggregation, and/or transmission parameter adaptation.

11. Wireless communication equipment configured for use in a wireless communication network, the wireless communication equipment comprising:
    communication circuitry; and
    processing circuitry configured to:
       as listen-before-talk (LBT) attempts occur over time on a transmission resource, make updates to a performance rating for the transmission resource to reflect an observed likelihood of LBT attempt success or failure on the transmission resource;
       responsive to a failed LBT attempt on the transmission resource occurring unexpectedly according to the performance rating, apply a bias to the performance rating to reflect a greater likelihood of LBT attempt failure, or a smaller likelihood of LBT attempt success, than actually observed on the transmission resource, and relax the applied bias over time; and
       control transmission on the transmission resource based on the performance rating for the transmission resource.

12. The wireless communication equipment of claim 11, wherein a magnitude of the bias initially applied to the performance rating, before the applied bias is relaxed over time, is equal to a difference between:

an observed likelihood of LBT attempt success as of occurrence of the failed LBT attempt; and an observed likelihood of LBT attempt failure as of occurrence of the failed LBT attempt.

13. The wireless communication equipment of claim 11, wherein the processing circuitry is configured to relax the applied bias over time by reducing a magnitude of the applied bias at a rate proportional to a current magnitude of the applied bias such that a magnitude of the applied bias exponentially decays.

14. The wireless communication equipment of claim 11, wherein the processing circuitry is configured to relax the applied bias over time by periodically halving the bias to apply to the performance rating.

15. The wireless communication equipment of claim 11, wherein the processing circuitry is configured to apply the bias by applying the bias to the performance rating until the next LBT attempt occurs on the transmission resource.

16. The wireless communication equipment of claim 11, wherein:
the performance rating is specific to a certain wireless device and is selectively updated based on LBT attempts made on the transmission resource for a transmission to or from the certain wireless device; or
the performance rating is common across multiple wireless devices and is updated based on LBT attempts made on the transmission resource for a transmission to or from any of the multiple wireless devices.

17. The wireless communication equipment of claim 11, wherein the processing circuitry is further configured to determine whether a failed LBT attempt on the transmission resource occurs unexpectedly according to the performance rating by:
comparing the performance rating before the failed LBT attempt with the performance rating after the failed LBT attempt; and
determining whether or not the failed LBT attempt on the transmission resource occurs unexpectedly, based on said comparing.

18. The wireless communication equipment of claim 11, wherein the processing circuitry is further configured to either:
determine that the failed LBT attempt on the transmission resource occurs unexpectedly if the performance rating before the failed LBT attempt reflects a higher observed likelihood of LBT attempt success on the transmission resource than the performance rating after the failed LBT attempt; or
determine that the failed LBT attempt on the transmission resource occurs unexpectedly if the performance rating before the failed LBT attempt reflects a lower observed likelihood of LBT attempt failure on the transmission resource than the performance rating after the failed LBT attempt.

19. The wireless communication equipment of claim 11, wherein the processing circuitry is further configured to perform said updating, applying, relaxing, and controlling for each of multiple transmission resources, wherein the processing circuitry is configured to perform said controlling based on the respective performance ratings for the multiple transmission resources.

20. The wireless communication equipment of claim 11, wherein the processing circuitry is configured to control transmission on the transmission resource based on the performance rating for the transmission resource by, based on the performance rating for the transmission resource, performing transmission resource selection, transmission resource aggregation, and/or transmission parameter adaptation.

* * * * *